(12) United States Patent
Foster et al.

(10) Patent No.: US 8,509,404 B2
(45) Date of Patent: Aug. 13, 2013

(54) PREPAID AUTOMATIC DIALER

(75) Inventors: Alyssa C Foster, Tucker, GA (US); Christine Boettcher, Acworth, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 416 days.

(21) Appl. No.: 12/748,122

(22) Filed: Mar. 26, 2010

(65) Prior Publication Data
US 2011/0235792 A1    Sep. 29, 2011

(51) Int. Cl.
  H04M 1/56  (2006.01)
  H04M 11/00  (2006.01)

(52) U.S. Cl.
  USPC ........................................ 379/114.2; 455/405

(58) Field of Classification Search
  USPC ......................................... 379/114.15–114.2
  See application file for complete search history.

(56) References Cited

U.S. PATENT DOCUMENTS

| | | | | |
|---|---|---|---|---|
| 6,745,022 | B2* | 6/2004 | Knox | 455/406 |
| 2001/0028705 | A1* | 10/2001 | Adams et al. | 379/114.2 |
| 2003/0194988 | A1* | 10/2003 | Knox | 455/406 |
| 2004/0023636 | A1* | 2/2004 | Gurel | 455/405 |
| 2005/0190789 | A1* | 9/2005 | Salkini et al. | 370/466 |
| 2008/0043949 | A1* | 2/2008 | Tam | 379/114.13 |
| 2009/0017847 | A1* | 1/2009 | Mendiola et al. | 455/466 |
| 2009/0168660 | A1* | 7/2009 | Bhatia et al. | 370/252 |
| 2010/0146421 | A1* | 6/2010 | New | 715/764 |
| 2010/0330956 | A1* | 12/2010 | Estrada | 455/406 |
| 2011/0064028 | A1* | 3/2011 | Hinrikus et al. | 370/328 |

OTHER PUBLICATIONS

Skype: http://www.skype.com/mobile/; print date Mar. 26, 2010, 1 page.
Vonage: http://www.vonagemobile.com/?gclid=CNH6o4TDrqAC Fdlw5Qod0SXcMg; print date Mar. 26, 2010, 1 page.
Mobile App—Penny Talk Mobile http://www.pennytalk.com/iphone; print date Mar. 26, 2010, 4 pages.
PennyTalk—Global Calling Card http://www.pennytalk.com/?source=GOOG_PT1103&gclid=Cl2q_s2R16ACFdlw5Qod cyfZBQ; print date Mar. 26, 2010, 2 pages.
Card Caller http://itunes.apple.com/us/app/card-caller-free-calling-card/id295454880?mt=8; print date Mar. 26, 2010, 3 pages.
Pingo EZ Dial http://itunes.apple.com/app/pingo-ez-dial/id325530982?mt=8; print date Mar. 26, 2010, 3 pages.
PennyTalk—How it works http://www.pennytalk.com/how; print date Mar. 26, 2010, 2 pages.

(Continued)

*Primary Examiner* — Simon Sing
*Assistant Examiner* — Solomon Bezuayehu

(57) ABSTRACT

A user device is configured to download an autodialer application that permits a user, of the user device, to purchase a prepaid calling plan and make calls using the prepaid calling plan; receive an instruction to purchase the prepaid calling plan; receive payment to establish a prepaid balance associated with the prepaid calling plan; present confirmation information when the payment is received, the confirmation information including the prepaid balance and access information; receive a request to make a call using the prepaid calling plan, the request including a number corresponding to a destination user device; call the destination user device using the number corresponding to the destination user device and the access information; determine a duration of the call to the destination user device; compute a cost of the call based on the duration of the call; and update the prepaid balance based on the cost of the call.

20 Claims, 13 Drawing Sheets

(56) References Cited

OTHER PUBLICATIONS

PennyTalk—FAQ http://www.pennytalk.com/faqs ; print date Mar. 26, 2010, 8 pages.
PennyTalk—Features http://www.pennytalk.com/features; print date Mar. 26, 2010, 2 pages.
Pingo http://www.pingo.com/en/whypingo.do; print date Mar. 26, 2010, 1 page.
Calling Card for Android http://sites.google.com/site/acallingcard/versions; print date Mar. 26, 2010, 1 page.
Applications in iPhone App Store http://www.apptism.com/apps?query=calling+card&x=0&y=0 print date Mar. 26, 2010, 7 pages.
Calling Card http://homepage.mac.com/aamann/CallingCard.html print date Mar. 26, 2010, 3 pages.

* cited by examiner

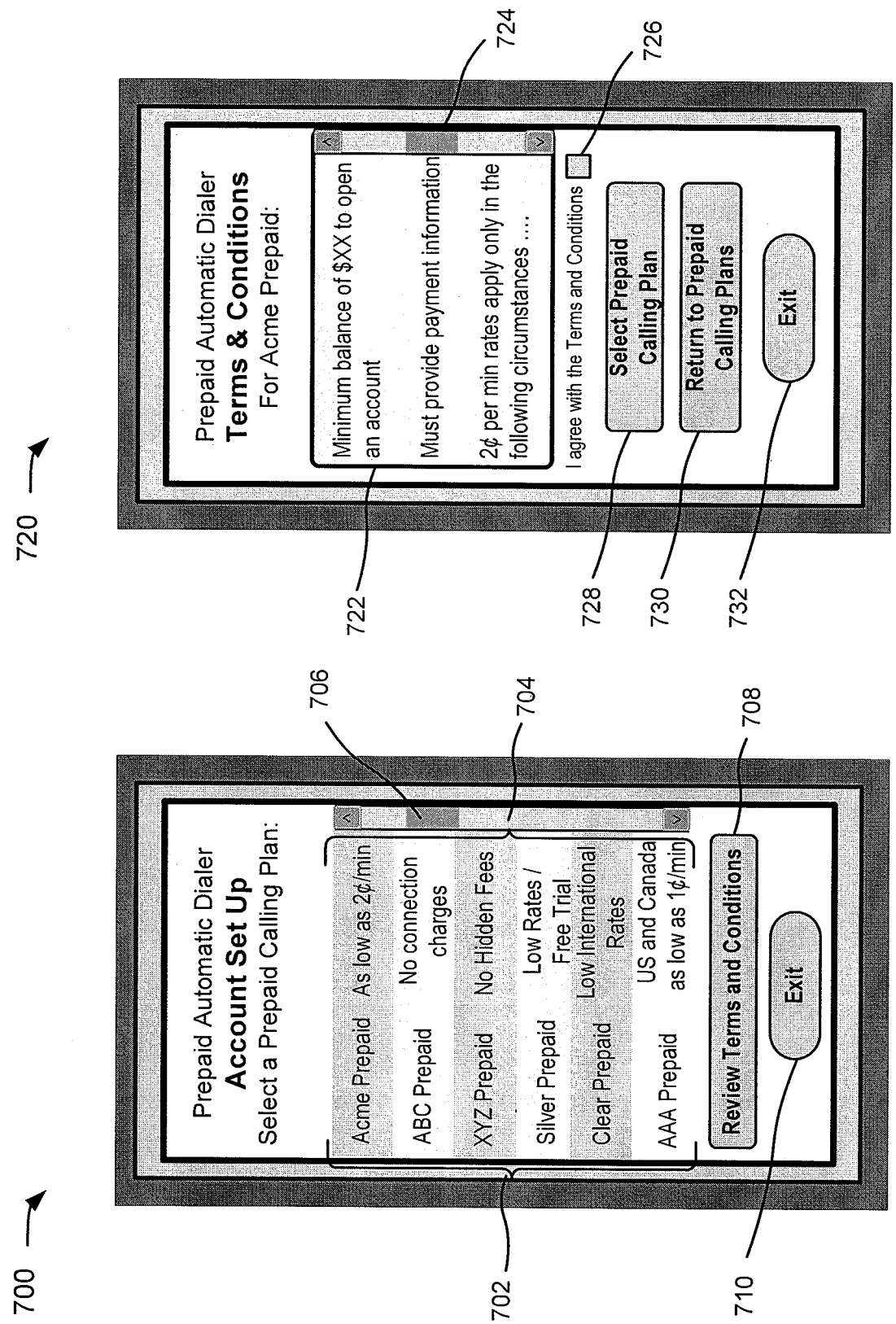

PREPAID AUTOMATIC DIALER

BACKGROUND

Prepaid phone cards provide a convenient way for a user to make local, long distance, or international calls from a user device. The user, of a user device, can purchase a prepaid phone card from a vendor and the user can use the prepaid phone card to pay for a call made from the user device. The balance on the prepaid phone card (e.g., a prepaid balance) is reduced each time the user makes a call (e.g., due to connection fees, surcharges, per minute fees, etc.). When the prepaid balance on the prepaid phone card reaches zero or some other amount, the user can discard the prepaid phone card, can purchase a new prepaid phone card, or can interact with the vendor to recharge the prepaid phone card to restore or add to the prepaid balance.

Prepaid phone cards may be used in conjunction with applications installed on a user device that enables a user to place a call, from the user device, using a particular prepaid phone card or a prepaid calling plan.

BRIEF DESCRIPTION OF THE DRAWINGS

FIG. 7A is a diagram of an exemplary account set up user interface that is capable of being presented on the user device of FIG. 2;

FIG. 7B is a diagram of an exemplary terms and conditions user interface that is capable of being presented on the user device of FIG. 2;

DETAILED DESCRIPTION OF PREFERRED EMBODIMENTS

Figure 1:
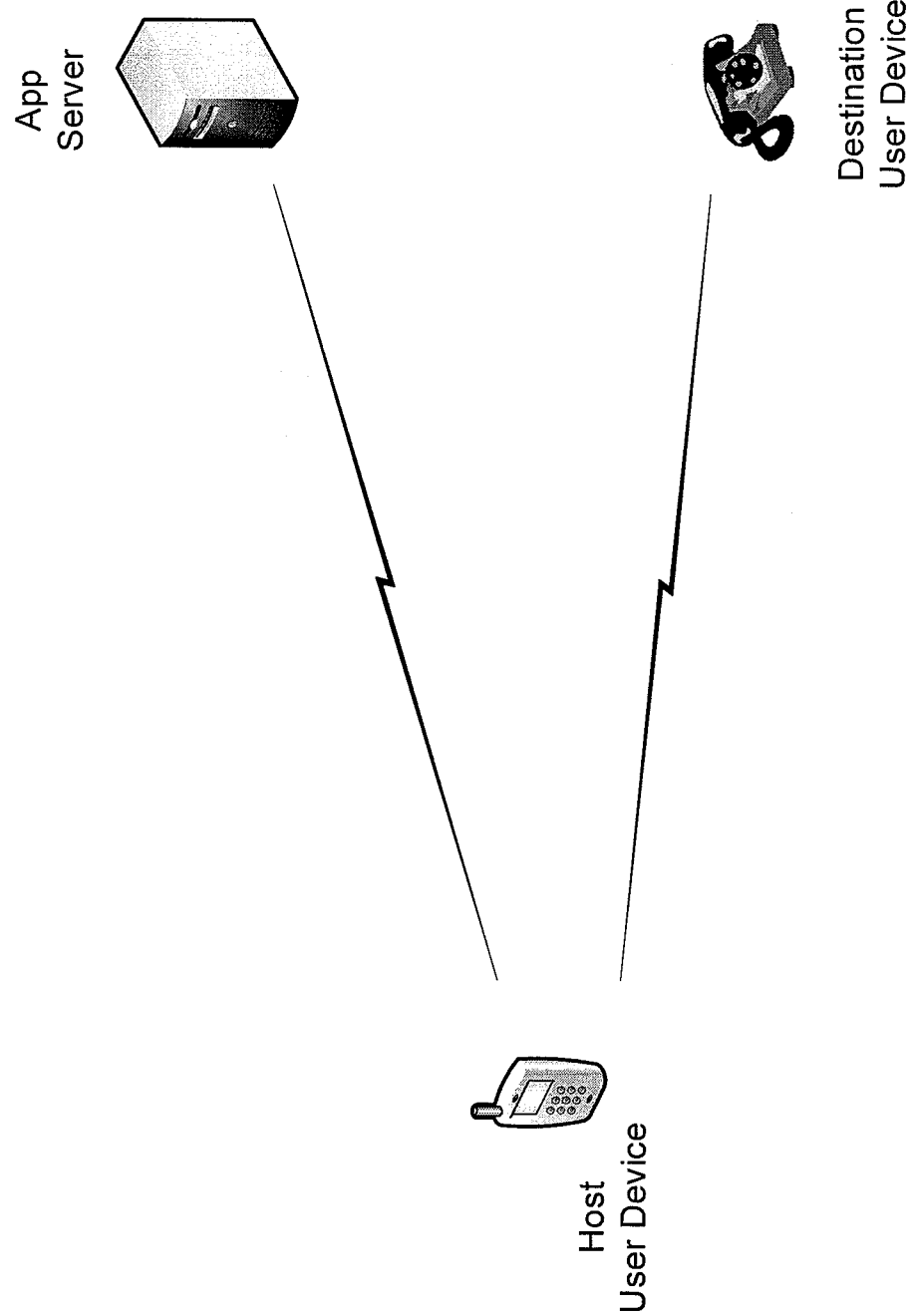
FIG. 1 is a diagram that illustrates an overview of a prepaid automatic dialer implementation described herein.

The following detailed description refers to the accompanying drawings. The same reference numbers in different drawings may identify the same or similar elements. Also, the following detailed description does not limit the invention.

An implementation described herein may include systems and/or methods that provide for a prepaid automatic dialer application (hereinafter referred to as a "prepaid autodialer application") via which a user can purchase a prepaid calling plan and use the prepaid calling plan to make telephone calls. The prepaid autodialer application can automatically perform a recharge operation to replenish the balance associated with the prepaid calling plan.

As described herein, a user may set up a prepaid autodialer application on a user device. For example, a user, of a user device, may download a prepaid autodialer application from a vendor (e.g., a vendor associated with the user device and/or some other third party vendor), via the user device and may set up an account (hereinafter referred to as a "prepaid calling plan"), associated with the prepaid autodialer application, to enable the user to place calls, from the user device, using the prepaid autodialer application.

The user may, without accessing a third party website, use the prepaid autodialer application to select a particular prepaid calling plan (e.g., from a list of prepaid calling plans associated with various vendors) and may provide payment information, via the prepaid autodialer application, to establish a particular balance associated with the prepaid calling plan (hereinafter referred to as a "prepaid balance"). The prepaid autodialer application may receive the prepaid calling plan information and/or the payment information and may provide a particular access number, a particular confirmation number, and/or a particular personal identification number (PIN) to the user of the user device.

In another example, the user may use the prepaid autodialer application to specify customized settings associated with the prepaid calling plan that may be used by the user to place local, long distance, international, video, and/or other calls using the prepaid autodialer application. Additionally, or alternatively, the user may specify other prepaid calling plan settings. For example, the user may establish settings to import contacts, to enable automatic recharge operations, to allow automatic updates from the vendor, to enable long distance calling, to enable international calling, and/or to enable video calling, etc.

As further described herein, the user may specify that the prepaid calling plan be automatically recharged via an automatic recharge operation. For example, the user may provide user account information and may enable the prepaid autodialer application to perform a manual recharge operation (e.g., when instructed by the user) and/or to perform an automatic recharge operation in which a particular user bank account, user credit/debit account (e.g., debit card, credit card etc.), and/or other account, associated with the user, may be automatically debited to replenish the prepaid balance to an amount specified by the user. The automatic recharge operation may be performed in a manner that is transparent to the user. Additionally, or alternatively, the prepaid autodialer application may enable the prepaid balance, associated with the prepaid autodialer application, to be automatically replenished without requiring the user to purchase a calling card, to purchase a new prepaid calling plan, to interact with a third party vendor and/or to interact with the user device.

As still further described herein, the prepaid autodialer application may be used to place calls on the user device, manage prepaid calling plans, manage contacts and/or to perform other operations, such as communicate with customer service, directory assistance, check prepaid balance information, etc. For example, the user may use the prepaid autodialer application to place local calls, long distance calls, international calls, and/or other calls. In another example, the user may select a particular contact, from a contacts list and may automatically place a local call, a long distance, or an international call with a single command (e.g., by pressing a single button, touching the screen associated with the user device, etc.). The prepaid autodialer application may place the call, may track the length of the call, may compute the cost of the call, and/or may update prepaid balances as a result of the call.

FIG. 1 is a diagram that illustrates an overview of a prepaid automatic dialer implementation described herein. As illustrated in FIG. 1, a user device may communicate with an application server associated with a third party vendor and may place calls to and/or receive calls from a destination user device. The destination user device may be a local user device (e.g., that makes local calls to and/or receives local calls from the user device); a domestic long distance user device (e.g., that makes long distance calls to and/or receives long distance domestic calls from the user device); or an international user device (e.g., that sends international calls to and/or receives international calls from the user device). The user device may communicate with a third party application server to download a prepaid autodialer application which may be installed on the user device.

A set up operation may be performed. For example, the prepaid autodialer application may present an account set up user interface for display on the user device. The account set up user interface may include a list of prepaid calling plans from which the user may choose a particular prepaid calling plan. The user may select and purchase a particular prepaid calling plan via the account set up user interface and without accessing a third party website. In another example, the user may access a third party website, via the user device and/or via some other device, such as a personal computer, and may purchase a particular prepaid calling plan.

The prepaid autodialer application may present terms and conditions associated with the particular prepaid calling plan and the user may review the terms and conditions, may agree to the terms and conditions (e.g., by selecting a particular box displayed by the user interface), and may choose the particular prepaid calling plan. The prepaid autodialer application may present a payment information user interface on the user device and the user may specify a desired prepaid balance (e.g., $50, $250, etc.) and may provide payment information (e.g., bank account information, credit/debit card type, card number, expiration date, recharge information, etc.). The prepaid autodialer application may receive the prepaid balance information and the payment information, via the payment information user interface, and may present a confirmation user interface for display on the user device. The confirmation user interface may display confirmation information, such as an access number, a personal identification number (PIN), the prepaid balance specified by the user, and/or other confirmation information.

User settings may be specified. For example, the prepaid autodialer application may present a settings user interface for display on the user device. The user may specify settings that are customized to suit the user calling requirements. In one example, the user may choose to import contacts, from the user device, to the prepaid autodialer application. In another example, the user may specify an automatic recharge operation in which the user enables the prepaid autodialer application to replenish the prepaid balance using the payment information provided by the user when setting up the prepaid calling plan and/or using other payment information. In yet another example, the user may enable long distance calling, international calling, video calling, etc.

In another implementation, the prepaid autodialer application may enable a user to select a prepaid calling plan that automatically permits the user to place local, long distance, international calls, video calls, and/or other calls from the user device without the user specifying customized settings.

The prepaid autodialer application may be used to place a call from the user device. For example, the user may, using the prepaid autodialer application, dial a number (e.g., a local number, a long distance number if long distance calling is enabled, or an international number if international calling is enabled) corresponding to a destination user device. Additionally, or alternatively, the user may select particular contact information associated with the destination user device, from a contacts list (e.g., if contacts were imported from the user device into the prepaid autodialer application). The prepaid autodialer application may determine whether the prepaid balance is sufficient to cover the costs associated with the call (e.g., the prepaid balance is greater than some threshold). If the autodialer determines that the prepaid balance is sufficient to cover the call, then the prepaid autodialer application may cause the user device to place the call in accordance with the number entered into the keypad or in accordance with the contact information. If, however, the prepaid autodialer application determines that the prepaid balance is not sufficient to cover the costs of the call, then the prepaid autodialer application may perform a recharge operation (e.g., manual or automatic recharge operation depending on the user settings).

A recharge operation may be performed. For example, the user of the user device may request to replenish the prepaid balance associated with the prepaid autodialer application and the prepaid autodialer application may present a recharge user interface for display on the user device. The user may enter confirmation information (e.g., the access number, the PIN, confirmation number and/or other information, associated with the user, that was received from the prepaid autodialer application when the account set up was confirmed by the prepaid autodialer application). Additionally, or alternatively, the user may enter payment information to replenish prepaid balances. The prepaid autodialer application may receive the payment information, access number and/or PIN number, may send the payment information to the application server, and/or may update the prepaid balance associated with the prepaid autodialer application.

In another example, the prepaid autodialer application may perform an automatic recharge operation. For example, the prepaid autodialer application may determine that the prepaid balance is not sufficient to cover the costs of a particular call (e.g., the prepaid balance is greater than some threshold) and may automatically perform a recharge operation (e.g., if the user enabled automatic recharging operations during the set up operation). In this example, the prepaid autodialer application may send payment information, received from the user during the account set up operation, to the application server and may update the prepaid balance in accordance with an amount specified by the user during the account set up operation. When the prepaid balance is replenished, as a result of the automatic recharge operation, the prepaid autodialer application may cause the user device to place the call, initiated by the user, from the contacts list and/or the number entered into the keypad associated with the prepaid autodialer application.

The prepaid autodialer application may improve the user experience when using prepaid calling cards and/or prepaid calling plans to place calls from a user device. The prepaid autodialer application may be downloaded to the user device and the prepaid autodialer application may present a list of prepaid calling plans from which the user may select a particular prepaid calling plan with which calls may be placed. The user may select and/or purchase the desired prepaid calling plan, from the prepaid autodialer application and without accessing a third party website, that may improve the user experience by providing alternatives that suit the calling habits associated with the user.

The prepaid autodialer application may permit the user to specify customized settings associated with local calling, long distance calling, international calling, video calling, etc. The prepaid autodialer application may permit the user to manually trigger a recharge operation to replenish a prepaid balance. Additionally, or alternatively, the prepaid autodialer application may enable the prepaid balance to be automatically replenished using a recharge operation that is transparent to the user. The prepaid autodialer application may enable the prepaid balance to be automatically replenished, in a manner that is transparent to the user, without requiring the user to purchase a new calling card, to visit a store associated with the vendor, and/or to access a third party website associated with a vendor.

Figure 2:
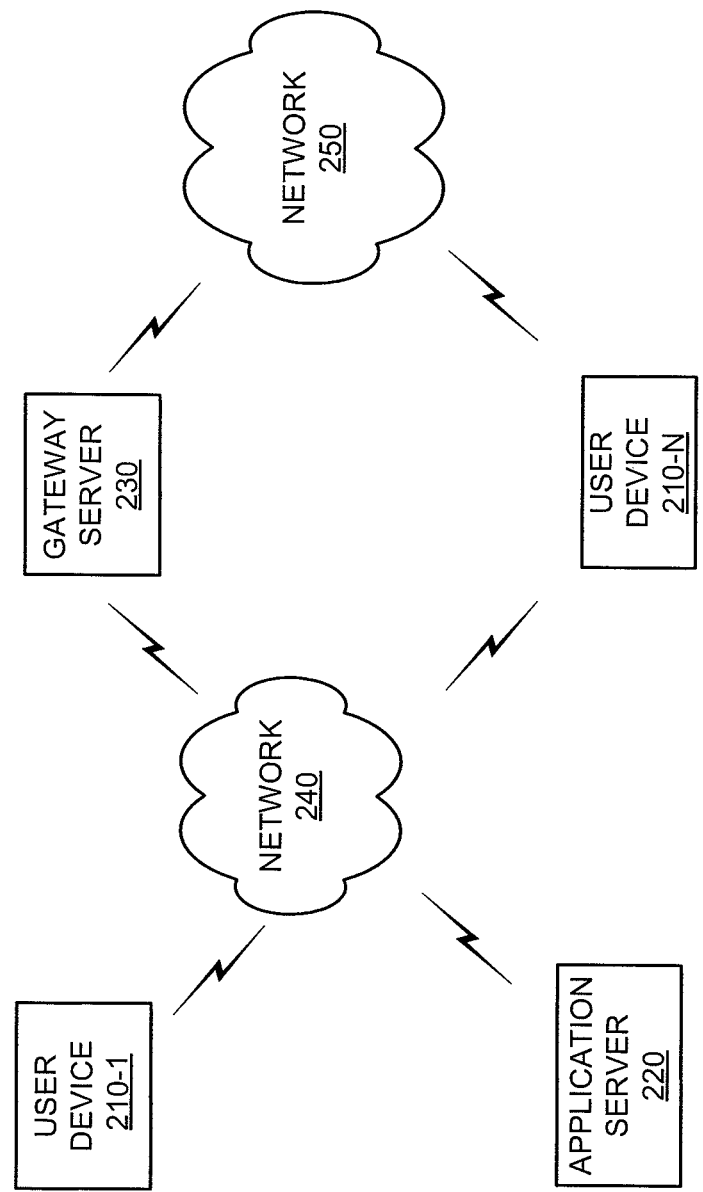
FIG. 2 is a diagram of an exemplary network in which systems and/or methods described herein may be implemented.

FIG. 2 is a diagram of an exemplary network 200 in which systems and/or methods described herein may be implemented. As shown in FIG. 2, network 200 may include user devices 210-1, . . . , 210-N (where N≧1) (hereinafter referred to collectively as "user devices 210" and individually as "user device 210"), application server 220, gateway server 230, network 240 and network 250. User devices 210, application server 220, gateway server 230, network 240, and network 250 are illustrated in FIG. 2 for simplicity. In practice, there may be additional, fewer, different, or differently arranged user devices 210, application servers 220, gateway servers 230, networks 240, and/or networks 250.

Also, in some implementations, one or more of the devices of network 200 may perform one or more functions described as being performed by another one or more of the devices of network 200. For example, application server 220, and gateway server 230 may be integrated into a single device. Components of network 200 may interconnect via wired connections, wireless connections, or a combination of wired and wireless connections.

User device 210 may include any computation or communication device, such as a wireless mobile communication device that is capable of communicating with application server 220, gateway server 230, and/or user device 210-N. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set top box (STB), a personal gaming system, or another type of computation or communication device. In one implementation, user device 210 may generate and/or store information in a memory associated with user device 210.

User device 210 may be a destination user device (e.g., user device 210-N) and/or a host user device 210 (e.g., user device 210-1). For example, destination user device 210-N may receive calls (e.g., local calls, long distance calls, international calls, video calls, etc.) from and/or send calls to a host user device 210-1. Host user device 210-1 may host a prepaid autodialer application and may send calls to and/or receive calls from destination user device 210-N. In another example, user device 210-1 may act as a destination user device 210 with respect to a particular call received from a particular user device 210 and may act as a host user device 210 with respect to another call to another user device 210.

User device 210-1 may communicate with application server 220 to obtain a prepaid autodialer application, to perform a set up operation, to perform a recharge operation, to make/receive calls, and/or to perform other operations. User device 210 may present user interfaces associated with the prepaid autodialer application to enable the prepaid autodialer application to perform set up operations, receive payment for prepaid accounts, to confirm plan selections, to enable a user, of user device 210, to specify prepaid calling plan settings and to permit the user to use the prepaid autodialer application after the prepaid calling plan is set up. User device 210-1 may communicate with application server 220, may forward payment information to application server 220, and/or may generate confirmation information (e.g., an access number, a PIN, a confirmation number, etc.) as a result of the set up operation.

User device 210-1 may communicate with application server 220 when performing recharge operations. In one example, user device 210 may perform manual recharge operations when instructed by the user of user device 210. The prepaid autodialer application may receive payment information from the user and may replenish a prepaid balance, associated with the prepaid calling plan, by sending the payment information to application server 220. In another example, user device 210 may automatically perform recharge operations in a manner that is transparent to the user. In this example, user device 210-1 may retrieve, from memory, payment information received from the user during the account set up operation. User device 210 may send the payment information, to application server 220, to replenish a prepaid balance to an amount specified by the user during the set up operation. User device 210 may generate confirmation information (e.g. an access number, a PIN, a confirmation number, etc.) as a result of the manual and/or automatic recharge operation.

User device 210-1 may perform other operations. For example, user device 210-1 may communicate with application server 220 and/or gateway server 230 in order to place calls to destination user device 210-N. In another example, the prepaid autodialer application may instruct user device 210-1 to communicate with application server 220 to permit a user, of user device 210-1, to communicate with a customer service system and/or a customer service agent, associated with the prepaid calling plan. In yet another example, the prepaid autodialer application may instruct user device 210-1 to communicate with application server 220 to permit the user to communicate with directory assistance in order to place a call to a destination user device 210-N for which a telephone number and/or destination address information is not known to the user.

Application server 220 may include one or more server devices, or other types of computation or communication devices, that gather, process, search, store, and/or provide information in a manner similar to that described herein. Application server 220 may interface with user devices 210 and/or gateway server 230.

Application server 220 may send a prepaid autodialer application to user device 210-1. For example, application server 220 may store a prepaid autodialer application and/or prepaid calling plan information (e.g., terms and conditions, associated with a prepaid calling plan or set of prepaid calling plans, that may be reviewed and/or selected by a user of user device 210-N). Application server 220 may receive a request to send a prepaid autodialer application from user device 210-1 and may send the prepaid autodialer application to user device 210-1 in response to the request. Application server 220 may receive payment information, associated with a particular prepaid calling plan selected by the user of user device 210-1 as a result of an account set up operation and/or a recharge operation (e.g., to restore the prepaid balance to an amount specified by the user). Application server 220 may communicate with third party vendors, associated prepaid calling plans, and may receive updated terms and conditions for particular prepaid calling plans. Application server 220 may periodically update the application software associated with the prepaid autodialer application and/or the terms and conditions associated with particular prepaid calling plans stored in memory and/or stored in user devices 210-1.

Application server 220 may receive calls from user device 210 and may connect customer service and/or directory assistance to user device 210. Application server 220 may send confirmation information (e.g. access number, PIN, confirmation number, and/or other information associated with the user) to gateway server 230 to enable gateway server 230 to perform authentication operations when long distance calls and/or international calls are received from user device 210 and/or when the user, of user device 210, makes a long distance and/or international call from a device other than user device 210. Additionally, or alternatively, application server 220 may communicate with gateway server 230 to perform authentication operations when long distance and/or international calls are received, by gateway server 230, from user device 210 or the user of user device 210.

Gateway server 230 may include one or more server devices, or other types of computation or communication devices, that gather, process, search, store, and/or provide information in a manner similar to that described herein. Gateway server 230 may interface with user device 210-1, application server 220, and/or user device 210-N. Gateway server 230 may receive local calls from user device 210 and may forward the calls, via network 240, to the appropriate destination user device 210.

Gateway server 230 may handle long distance calls and/or international calls received from user device 210-1. For example, gateway server 230 may receive a call from user device 210-1 destined for an international user device 210-N. Gateway server 230 may authenticate user device and may forward the call, via an international network (e.g., network 250) to international destination user device 210-N. In another example, gateway server 230 may receive a long distance call from user device 210-1 destined for a long distance domestic user device 210-N. Gateway server 230 may authenticate user device 210 and may forward the call, via a long distance network (e.g., network 250) to long distance destination user device 210-N. Gateway server 230 may interact with application server 220 to receive confirmation information (e.g., access number, PIN, confirmation number and/or other information associated with the user of user device 210).

Network 240 may include a wide area network (WAN), a metropolitan area network (MAN), a telephone network (e.g., the Public Switched Telephone Network (PSTN), or a cellular network, such as the Public Land Mobile Network (PLMN)), an ad hoc network, an intranet, the Internet, a fiber optic-based network (e.g., a fiber optic service (FiOS) network), or a combination of networks. In one example, network 240 could be a wireless carrier and/or cellular network that connects user device 210-1 to gateway server 230 and/or application server 220. In another implementation, network 240 could be a service provider network, a broadband network, and/or the Internet that connects user device 210-1 to gateway server 230 and/or application server 220.

Network 250 may include a WAN, a metropolitan area network (MAN), a telephone network (e.g., PSTN, or a cellular network, such as the PLMN, an ad hoc network, an intranet, the Internet, a fiber optic-based network (e.g., a fiber optic service (FiOS) network), or a combination of networks. In one example, network 250 may transport long distance calls between host user device 210-1 and destination user device 210-N. In another example, network 250 may transport international calls between host user device 210-1 and destination user device 210-N.

Although not shown in FIG. 2, network 200 may include other devices, such as an authentication server, etc. These devices may perform certain functions described briefly below. Any of these functions may be performed by application server 220 and/or gateway server 230. Thus, one or more of these devices may be integrated into application server 220 and/or gateway server 230.

The authentication server may include one or more server devices, or other types of computation or communication devices, that authenticates user device 210. For example, the authentication server may receive a request to authenticate user device 210 based on information associated with application server 220 (e.g., an identifier associated with application server 220), information associated with a user of user device 210 (e.g., username, password, email address, PIN, etc.), and/or information associated with user device 210 (e.g., an identifier associated with user device 210).

Figure 3:
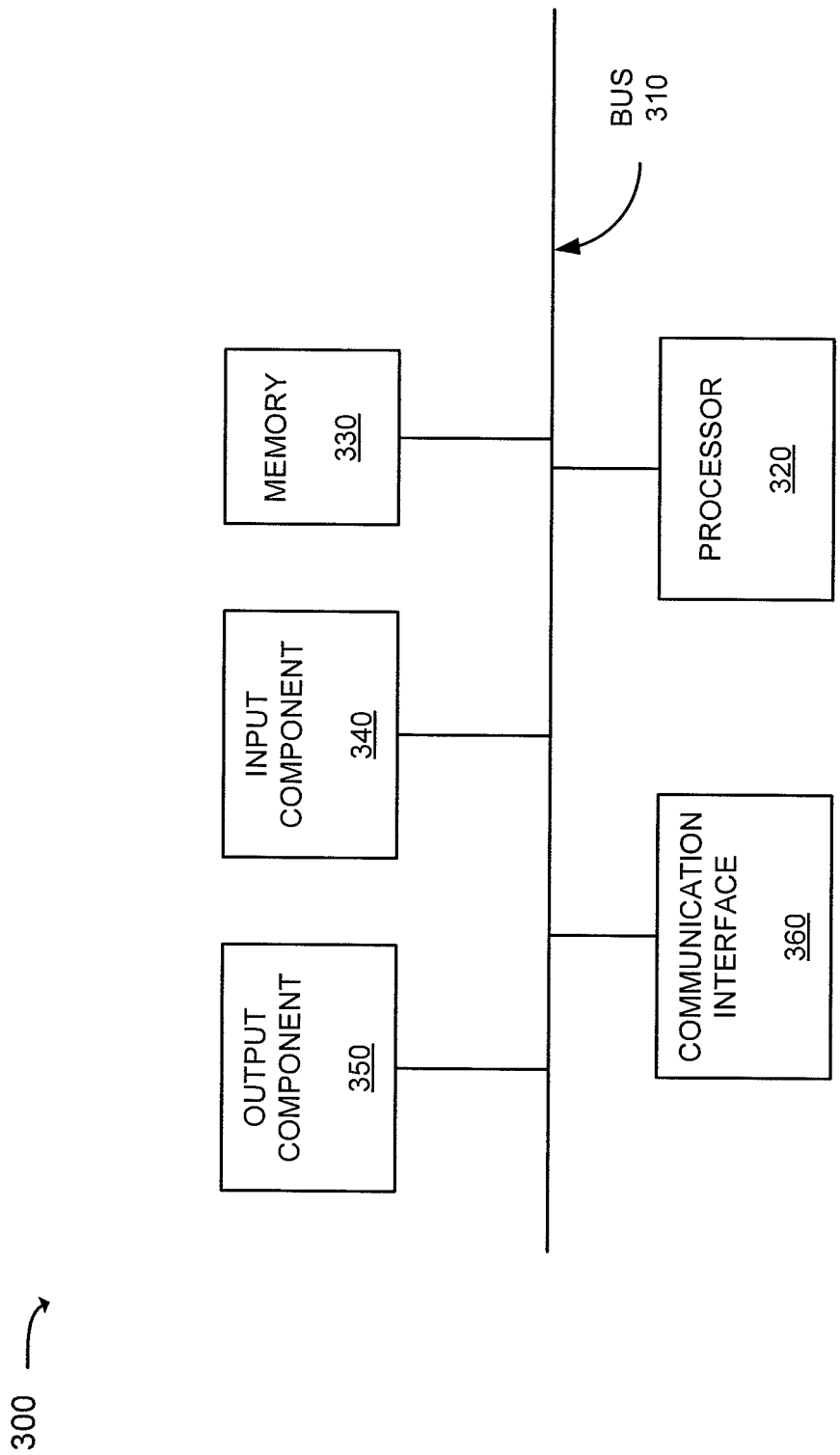
FIG. 3 is a diagram of exemplary components of one or more of the devices of FIG. 2.

FIG. 3 is a diagram of exemplary components of a device 300 that may correspond to application server 220 and/or gateway server 230. Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than depicted in FIG. 3. Additionally, or alternatively, in other implementations, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 360 may include mechanisms for communicating with another device or system via a network, such as network 240 and/or network 250.

As will be described in detail below, device 300 may perform certain operations relating to a prepaid autodialer application performing a purchase operation, a recharge operation, a calling operation and/or a set up operation. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
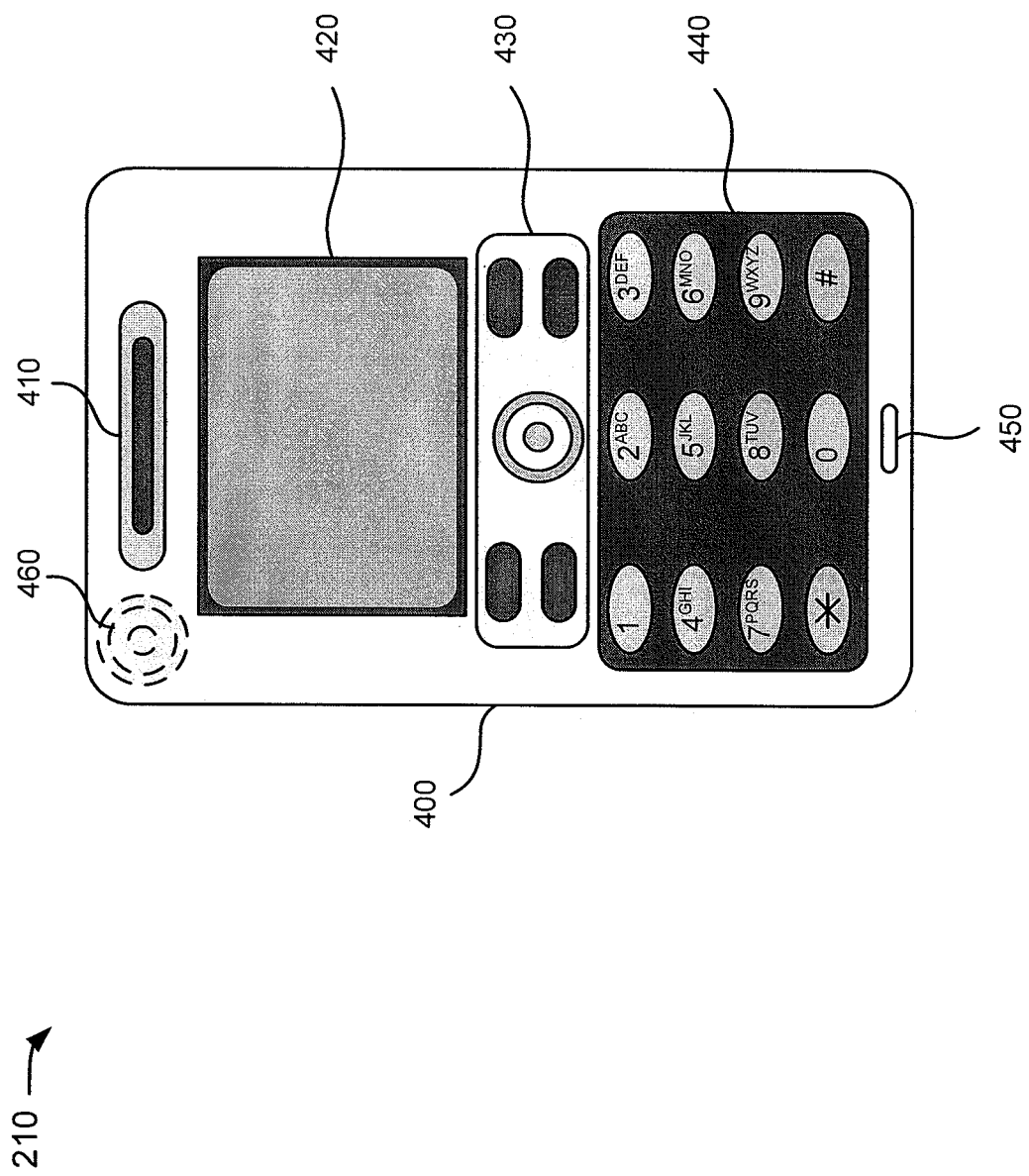
FIG. 4 is a diagram of an exemplary user device of FIG. 2.

FIG. 4 is a diagram of an exemplary user device 210. As shown in FIG. 4, user device 210 may include a housing 400, a speaker 410, a display 420, control buttons 430, a keypad 440, a microphone 450, and/or a camera 460. Although FIG. 4 depicts exemplary components of user device 210, in other implementations, user device 210 may contain fewer components, additional components, different components, or differently arranged components than illustrated in FIG. 4. In still other implementations, one or more components of user device 210 may perform one or more tasks described as being performed by one or more other components of user device 210.

Housing 400 may include a chassis on which some or all of the components of user device 210 are mechanically secured and/or are covered. Speaker 410 may include a component to receive input electrical signals from user device 210 and transmit audio output signals, which communicate audible information to a user of user device 210.

Display 420 may include a component to receive input electrical signals and present a visual output in the form of text, images, videos and/or combinations of text, images, and/or videos which communicate visual information to the user of user device 210. In one implementation, display 420 may display text input into user device 210, text, images, and/or video received from another device, and/or information regarding incoming or outgoing calls or text messages, emails, media, games, phone books, address books, the current time, etc.

Control buttons 430 may include one or more buttons that accept, as input, mechanical pressure from the user (e.g., the user presses a control button or combinations of control buttons) and may send electrical signals to processing unit 320 that may cause user device 210 to perform one or more operations. For example, control buttons 430 may be used to cause user device 210 to transmit information. Keypad 440 may include a standard telephone keypad or another arrangement of keys.

Microphone 450 may include a component to receive audible information from the user and send, as output, an electrical signal that may be stored by user device 210, transmitted to another user device, or cause the device to perform one or more operations. Camera 460 may be provided on a back side of user device 210, and may include a component to receive, as input, analog optical signals and send, as output, a digital image or video that can be, for example, viewed on display 420, stored in the memory of user device 210, discarded and/or transmitted to another user device 210.

Figure 5:
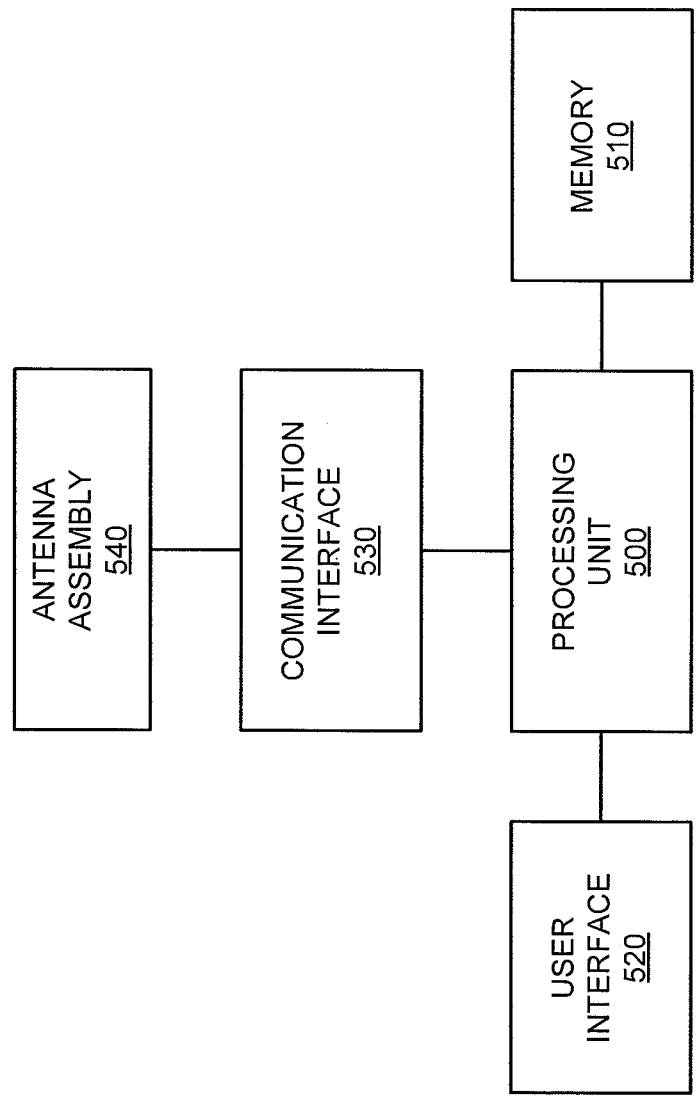
FIG. 5 is a diagram of exemplary components of the user device of FIG. 4.

FIG. 5 is a diagram of exemplary components of user device 210. As shown in FIG. 5, user device 210 may include a processing unit 500, a memory 510, a user interface 520, a communication interface 530, and/or an antenna assembly 540. Although FIG. 5 shows exemplary components of user device 210, in other implementations, user device 210 may contain fewer components, additional components, different components, or differently arranged components than depicted in FIG. 5. In still other implementations, one or more components of user device 210 may perform one or more tasks described as being performed by one or more other components of user device 210.

Processing unit 500 may include a processor, a microprocessor, an ASIC, a FPGA, or the like. Processing unit 500 may control operation of user device 210 and its components. In one implementation, processing unit 500 may control operation of components of user device 210 in a manner similar to that described herein. Memory 510 may include a RAM, a ROM, and/or another type of memory to store data and/or instructions that may be used by processing unit 500.

User interface 520 may include mechanisms for inputting information to user device 210 and/or for outputting information from user device 210. Examples of input and output mechanisms might include buttons (e.g., control buttons 430, keys of keypad 440 or a keyboard, a joystick, etc.); a touch screen interface to permit data and control commands to be input into user device 210; a speaker (e.g., speaker 410) to receive electrical signals and output audio signals; a microphone (e.g., microphone 450) to receive audio signals and output electrical signals; a display (e.g., display 420) to output visual information (e.g., a backup preferences user interface, web pages, etc.); a vibrator to cause user device 210 to vibrate; and/or a camera (e.g., camera 460) to receive video and/or images.

Communication interface 530 may include, for example, a transmitter that converts baseband signals from processing unit 500 to radio frequency (RF) signals and/or a receiver that converts RF signals to baseband signals. Alternatively, communication interface 530 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network and/or devices connected to a network (e.g., network 240 and/or network 250).

As described in detail below, user device 210 may perform certain operations, described herein, in response to processing unit 500 executing software instructions of a prepaid autodialer application and/or some other application contained in a computer-readable medium, such as memory 510. The software instructions may be read into memory 510 from another computer-readable medium or from another device via communication interface 530. The software instructions contained in memory 510 may cause processing unit 500 to perform processes that will be described later. Alternatively, hardwired circuitry may be used in place of or in combination with software instructions to implement processes described herein. Thus, implementations described herein are not limited to any specific combination of hardware circuitry and software.

Figure 6:
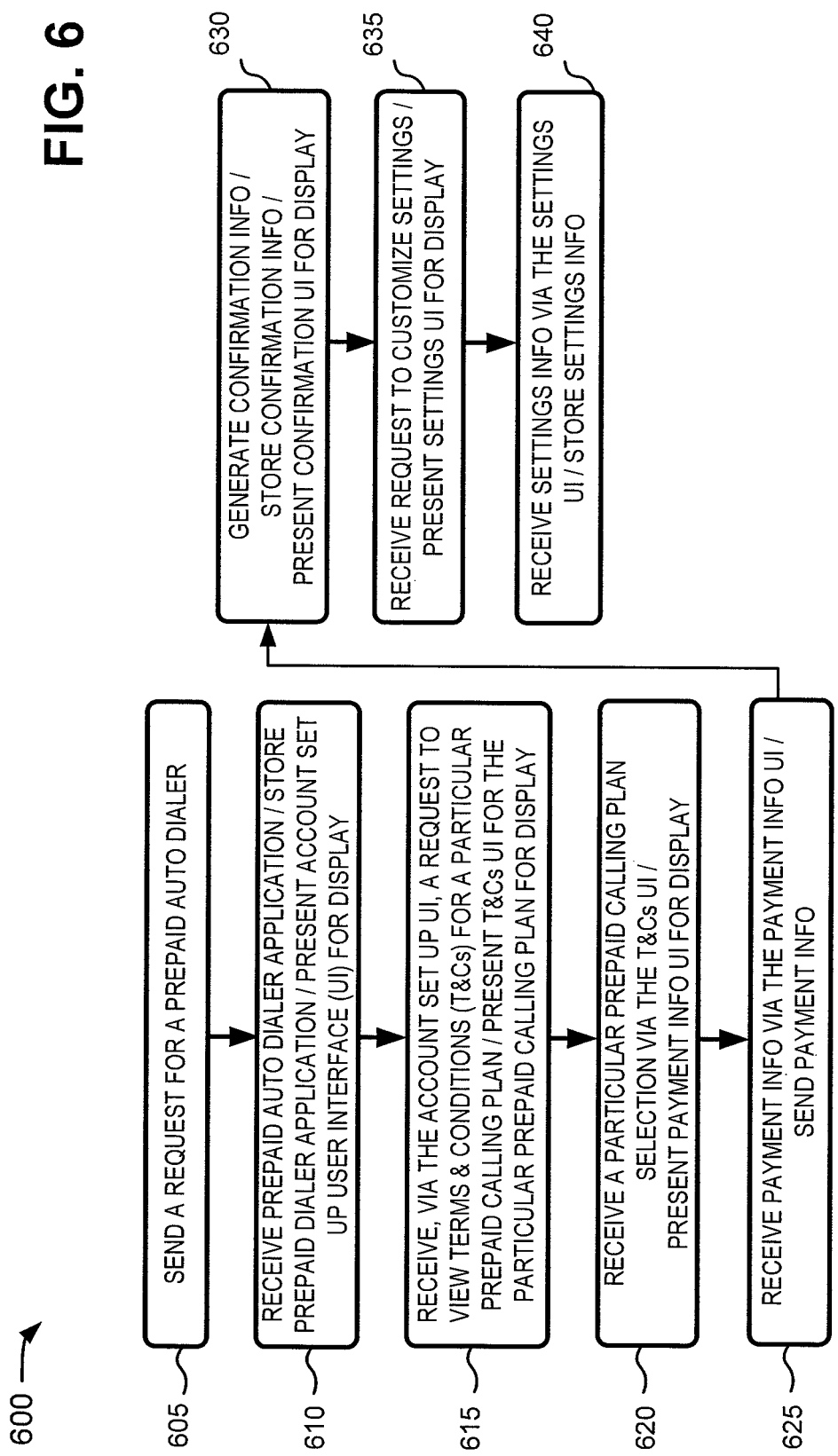
FIG. 6 is a flowchart of an exemplary process for setting up a prepaid automatic dialer application within an exemplary portion of the network of FIG. 2.

FIG. 6 is a flowchart of an exemplary process 600 for setting up a prepaid autodialer application within an exemplary portion of network 200. In one implementation, process 600 may be performed by user device 210. In another implementation, some or all of process 600 may be performed by a device or collection of devices separate from, or in combination with, user device 210. FIGS. 7A-7E are diagrams of exemplary user interfaces 700-770 that are capable of being presented on user device 210. A portion of process 600, of FIG. 6, will be described below with corresponding references to user interfaces 700-770, as shown in FIGS. 7A-7E, respectively.

Process 600 of FIG. 6 may include sending a request for a prepaid autodialer application (block 605). For example, a user, of user device 210, may desire to use a prepaid autodialer application in order to make local, long distance, international, and/or video call from user device 210. The user may cause user device 210 to communicate with a third party vendor (e.g., associated with application server 220 or via application server 220) by sending a request to application server 220 to obtain a prepaid autodialer application. Application server 220 may receive the request and may send a prepaid autodialer application to user device 210.

A prepaid autodialer application may be received, the prepaid autodialer application may be stored, and an account set up user interface may be presented for display (block 610). For example, user device 210 may receive the prepaid autodialer application from application server 220 and may store the prepaid autodialer application in a memory associated with user device 210. The prepaid autodialer application may retrieve, from the memory, information associated with an account set up user interface (e.g., account set up user interface 700 of FIG. 7A). For example, account set up user interface 700 of FIG. 7A may include data items, such as a list of prepaid calling plans 702, a summary of features for each prepaid calling plan 704, a scroll bar 706, a review terms and conditions button 708, and/or an exit button 710. User device 210 may present information associated with the account set up user interface (e.g., data items 702-710 associated with account set up user interface 700 of FIG. 7A) for display on user device 210 (e.g., display 420 of FIG. 4).

The list of prepaid calling plans may enable a user to peruse the prepaid calling plans and/or to select and purchase a particular prepaid calling plan, via the prepaid autodialer application and/or without accessing a third party website, that is suited to the desires and/or calling habits, associated with the user, such as calling rates, calling types (e.g., local, domestic long distance, international, etc.), plan features (e.g., ease of use, importing contacts, etc.), terms and conditions, etc.

A request to view terms and conditions for a particular prepaid calling plan may be received via the account set up user interface and a terms and conditions user interface, for the particular prepaid calling plan, may be presented for display (block 615). For example, the user may scroll through the list of prepaid calling plans 702 (e.g., using scroll bar 706 and/or by pressing a particular button on user device 210) and may via the prepaid autodialer application and/or without accessing a third party website, choose a particular prepaid calling plan (e.g., by pressing a particular button on a keypad associated with user device 210, by tapping the particular prepaid calling plan on a touch screen associated with user device 210 (e.g., display 420 of FIG. 4), selecting with a pointing device, etc.) to view terms and conditions associated with the particular prepaid calling plan (e.g., "Acme Prepaid" as shown in FIG. 7A). The prepaid calling plans may be offered by vendors that provide local calling services, long distance calling services, international calling services or a combination of local, long distance, international calling services and/or other services (e.g., messaging services, data services, etc.). The user may request to view terms and conditions, associated with the particular prepaid calling plan, by selecting and/or pressing review terms and conditions button 708 on account set up user interface 700 of FIG. 7A. The user may choose to exit the prepaid autodialer application and/or may choose to exit the account set up user interface 700 by selecting exit button 710 on the account set up user interface.

While FIG. 7A illustrates account set up user interface 700 that includes data items 702-710, in another implementation, account set up user interface 700 may include fewer data items, additional data items, different data items, or differently arranged data items than are described with respect to FIG. 7A.

The prepaid autodialer application may receive the request to review terms and conditions via the account set up user interface and may, without accessing a third party website, retrieve information associated with a terms and conditions user interface from a memory associated with user device 210 (e.g., terms and conditions user interface 720 of FIG. 7B). The prepaid autodialer application may present the information associated with the terms and conditions user interface to user device 210 for display (e.g., on display 420 of FIG. 4). For example, terms and conditions user interface 720 may include data items, such as a terms and conditions description 722, scroll bar 724, an indicator regarding whether the user agrees with the terms and conditions 726, a select prepaid calling plan button 728, a return to prepaid calling plans button 730, and/or an exit button 732. The user may scroll through the terms and conditions description 722 (e.g., using scroll bar 724) and may select a box indicating agreement with the terms and conditions (e.g., box 726) associated with the particular prepaid calling plan. The user may select the particular prepaid calling plan by pressing and/or touching the select prepaid calling plan button (e.g., select prepaid calling plan button 728). In the event that the user presses the select prepaid calling plan button without selecting the box indicating that the user agrees with the terms and conditions, the prepaid autodialer application may present a notification, for display on user device 210, alerting the user that the terms and conditions must be agreed to before the particular prepaid calling plan can be selected.

Alternatively, if the user does not agree with the terms and conditions or wishes to review other prepaid calling plans, the user may choose a different prepaid calling plan (e.g., by selecting return to prepaid calling plans button 730) or may exit the prepaid autodialer application (e.g., by selecting exit button 732) to review other prepaid calling plans at a later point in time.

While FIG. 7B illustrates terms and conditions user interface 720 that includes data items 722-732, in another implementation, terms and conditions user interface 720 may include fewer data items, additional data items, different data items, or differently arranged data items than are described with respect to FIG. 7B.

In another implementation, the user may access a third party website, via the user device and/or via some other device, such as a personal computer, and may, via the third party website, view terms and conditions associated with a particular prepaid calling plan.

A particular prepaid calling plan selection may be received via the terms and conditions user interface and a payment user interface may be presented for display (block 620). For example, the user may select a particular prepaid calling plan (e.g., by pressing and/or touching select prepaid calling plan button 728) and the prepaid autodialer application may receive the prepaid calling plan selection via the terms and conditions user interface (e.g., terms and conditions user interface 720). The prepaid autodialer application may retrieve, from a memory associated with user device 210 and without accessing a third party website, information associated with a payment information user interface (e.g., payment information user interface 740 of FIG. 7C) and may present the information, associated with the payment information user interface, to user device 210 for display. For example, payment information user interface 740 may include data fields, such as enter prepaid amount 742, credit card type 744, credit card number 746, credit card expiration 748, continue button 750, return to previous menu button 752 and/or exit button 754.

Figure 7D:
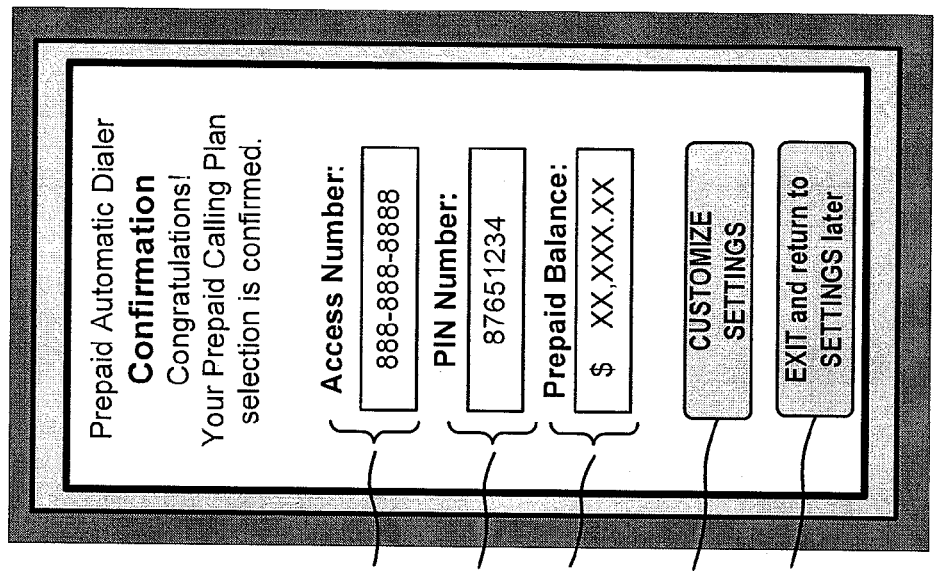
FIG. 7D is a diagram of an exemplary confirmation user interface that is capable of being presented on the user device of FIG. 2.
Figure 7C:
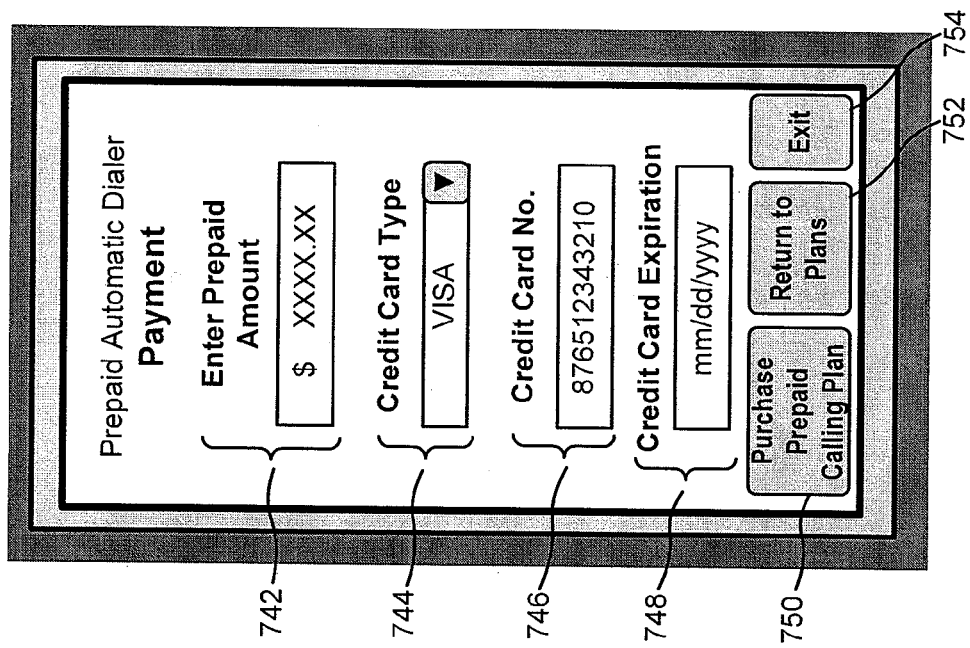
FIG. 7C is a diagram of an exemplary payment information user interface that is capable of being presented on the user device of FIG. 2.

While FIG. 7C illustrates payment user interface 740 that includes data fields 742-754, in another implementation, payment user interface 740 may include fewer data fields, additional data fields, different data fields, or differently arranged data fields than are described with respect to FIG. 7C.

Payment information may be received via the payment information user interface and payment information may be sent (block 625). For example, the user may purchase the selected prepaid calling plan by entering payment information into the payment user interface, such as a desired prepaid balance (e.g., by entering an amount of money into the enter prepaid amount data field 742) and/or information associated with an account to be debited for payment (e.g., the desired credit card type 744, credit card number 746, credit card expiration date 748, etc.). When the user has completed entering payment information, the user may purchase the prepaid calling plan (e.g., by pressing and/or touching purchase prepaid calling plan button 750). The prepaid autodialer application may receive the payment information (e.g., when the user selects purchase prepaid calling plan button 750) and may store the payment information in the memory associated with the user device 210. Storage of the payment information on user device 210, rather than a third party website, may enable the user to maintain control over personal and/or confidential information rather than entrusting the storage and/or protection of the personal and confidential information to a third party (e.g., a third party website). The payment information may be sent to a vendor associated with the particular prepaid calling plan (e.g., application server 220).

In another example, the user may choose not to purchase the particular prepaid calling plan and may view other prepaid calling plans in the account set up user interface (e.g., by selecting the return to plans button 752) or may exit the prepaid autodialer application (e.g., by selecting exit button 754).

In another implementation, the user may access a third party website, via the user device and/or via some other device, such as a personal computer, and may, via the third party website, purchase a particular prepaid calling plan. For example, the user may access the third party website, may view terms and conditions associated with a particular prepaid calling plan (as described above), and/or may provide payment information to purchase the particular prepaid calling plan.

Confirmation information may be generated, the confirmation information may be stored, and a confirmation user interface may be displayed (block 630). For example, the prepaid autodialer application may receive the payment information, may generate confirmation information as described above, and/or may store the payment information and/or the confirmation information, in a memory, associated with user device 210. The confirmation information may include a confirmation number, an access number associated with the prepaid calling plan, a PIN number, and/or a prepaid balance associated with the prepaid account. In one example, the access number and/or PIN number may be used by the prepaid autodialer application to make long distance and/or international calls, from user device 210, via gateway server 230. In another example, the access number may be used by the user, of user device 210, when placing a long distance and/or international call from another user device (e.g., a user device other than user device 210) that may enable the other user device to connect to gateway server 230 in order to place the long distance and/or international call. In yet another example, the access number and/or PIN number may be used, by the prepaid autodialer application, to perform recharge operations to replenish the prepaid balance associated with the selected prepaid calling plan.

A confirmation user interface may be displayed. For example, the prepaid autodialer application may retrieve, from a memory associated with user device 210, information associated with a confirmation user interface (e.g., confirmation user interface 760 of FIG. 7D) and may present the information, associated with the confirmation user interface, to user device 210 for display (e.g., on display 420 of FIG. 4). For example, information associated with confirmation user interface 760 may include data items, such as access number 762, PIN number 764, prepaid balance 766 (e.g., a sum of money, available minutes, prepaid credits, etc.), settings button 768, and/or an exit and return to settings later button 769.

While FIG. 7D illustrates confirmation user interface 760 that includes data items 762-769, in another implementation, confirmation user interface 760 may include fewer data items, additional data items, different data items, or differently arranged data items than are described with respect to FIG. 7D.

In another implementation, application server 220 may receive the payment information from user device 210 and may store the payment information in a memory associated with application server 220. Application server 220 may establish a prepaid account for the user of user device 210 and may generate confirmation information, associated with the user of user device 210, that may include a confirmation number, an access number associated with the prepaid calling plan, a PIN number, and/or a prepaid balance associated with the prepaid account. Application server 220 may send the confirmation information to user device 210.

A request to customize settings may be received and a settings user interface may be presented for display (block 635). For example, the user may view the confirmation user interface and may specify settings for the prepaid calling plan by selecting the customize settings button (e.g., customize settings button 768). Alternatively, the user may defer specifying settings to a later point in time by selecting (e.g., by selecting exit and return to settings later button 769).

The prepaid autodialer application may receive, via the confirmation user interface, a request to specify settings for the prepaid calling plan. The prepaid autodialer application may retrieve, from a memory, associated with user device 210, information associated with a settings user interface (e.g., settings user interface 770 of FIG. 7E) and may present the information associated with the settings user interface to user device 210 for display (e.g., on display 420 of FIG. 4). For example, the information associated with settings user interface 770 may include data fields, such as import contacts 772, automatic recharge 774, enable long distance calling 776, enable international calling 778, enable video calling 780, enable automatic updates 781, and/or save button 782.

Settings information may be received via the settings user interface and settings information may be stored (block 640). For example, the user may choose to import contacts (e.g., names, addresses, telephone numbers, email addresses, instant message addresses, etc.) from the memory associated with user device 210 or some other memory by selecting the box corresponding to import contacts 772 (e.g., by pressing a particular button on user device 210 or placing an "X" in enable box 782). In another implementation, the contacts may be automatically imported from the memory without user intervention and/or without the user selecting a particular box to import contacts.

In another example, the user may enable an automatic recharge operation by selecting the box corresponding to enable automatic recharging 774 (e.g., by selecting enable box 784). In this example, the user may authorize the prepaid autodialer application to use the payment information received from the user, via the payment user interface 740, described above with respect to FIG. 7C, by selecting the yes box 786, by entering a PIN in enter PIN box 786 (e.g., the PIN received via the confirmation user interface 760 of FIG. 7D), and/or by entering a recharging amount in maximum recharge amount authorized box 786. If, however, the user does not authorize the prepaid autodialer application to use payment information, received via user interface 740 (e.g., by selecting the "no" box 786), then the prepaid autodialer application may, at a later point in time when a recharge operation is triggered (e.g., when the prepaid balance reaches zero or some other value), display payment user interface 740, which may permit the user to enter payment information for the recharge operation.

The user may enable long distance, international calling, and/or video calling. For example, the user may enable long distance calling by selecting the box corresponding to enable long distance calling 776 (e.g., by pressing a particular button on user device 210 or placing an "X" in enable box 788). In another example, the user may enable international calling by selecting the box corresponding to enable international calling 778 (e.g., by selecting enable box 790). In yet another example, the user may enable video calling by selecting the box corresponding to enable video calling 780 (e.g., by selecting enable box 792).

In another implementation, the local calling, long distance calling, international calling, and/or video calling may be automatically enabled without user intervention and/or without the user selecting a particular box or set of boxes to enable local calls, long distance calls, international calls, and/or video calls.

The user may enable automatic updates to the prepaid autodialer application. For example, the user may enable automatic updates to the prepaid autodialer application by selecting the box corresponding to enable automatic updates 781 (e.g., by pressing a particular button on user device 210 or placing an "X" in enable box 793). In this example, if the user enables automatic updates, then software updates, associated with the prepaid autodialer application, may be periodically received by user device 210, from application server 220, and may be used by the prepaid autodialer application. Additionally, or alternatively, if the user enables automatic updates, then information from a third party vendor, associated with the selected prepaid calling plan, may be received and stored on user device 210. Information from the third party vendor may include store locations, promotional materials, user tips associated with the prepaid autodialer application, offers to sell goods and/or services, etc.

In another example, the user may elect to accept a certain quantity of advertisements (e.g., commercials, bulletins, announcements, promotional materials, store location information, offers for the sale of goods and/or services, etc.) from the third party vendor, in exchange for free prepaid credits, free minutes, etc. In this example, the user may select an option to accept a certain number of advertisements in exchange for a particular number of free minutes and/or the user may accept another option to accept a certain quantity of minutes of advertisements in exchange for a particular amount of money or prepaid credits in the prepaid account. The advertisements may be viewed on user device 210 and/or another device associated with the user (e.g., a television set connected to network 240 and/or network 250). In yet another example, advertisements (e.g., commercials, bulletins, announcements, promotional materials, store location information, offers for the sale of goods and/or services, etc.) may be received, by user device 210 and/or another device associated with the user, from the third party vendor (e.g., the prepaid calling plan vendor and/or another vendor). User device 210 may automatically display the advertisements and the user may view the advertisements, may ignore the advertisements, and/or may save or discard the advertisements. In still another example, the user may, by selecting a particular button (not shown) on the settings user interface (e.g., settings user interface 770 of FIG. 7E), disable user device 210 from displaying the advertisements received from the third party vendor.

Figure 7E:
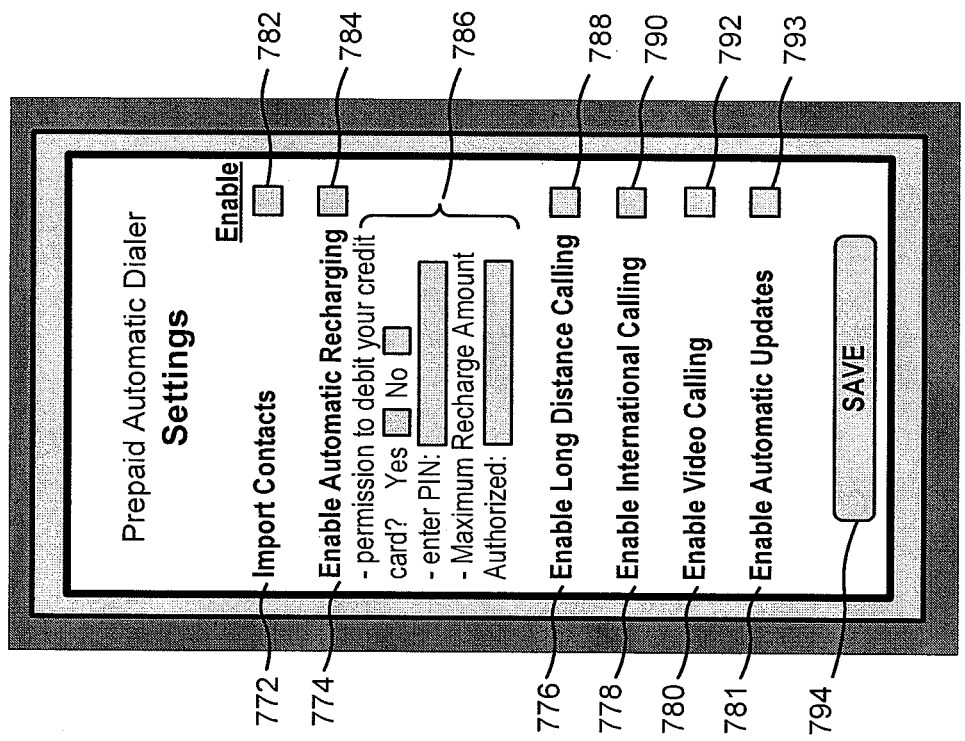
FIG. 7E is a diagram of an exemplary settings user interface that is capable of being presented on the user device of FIG. 2.

While FIG. 7E illustrates settings user interface 770 that includes data fields 772-781, in another implementation, settings user interface 770 may include fewer data fields, additional data fields, different data fields, or differently arranged data fields than are described with respect to FIG. 7E.

Settings information may be stored. For example, the user may finish specifying settings for the prepaid calling plan and may save the settings information (e.g., by pressing a particular button on user device 210 or by pressing or touching save button 794). The prepaid autodialer application may receive the request to save the settings information and may store the settings information in a memory associated with user device 210.

Figure 8A:
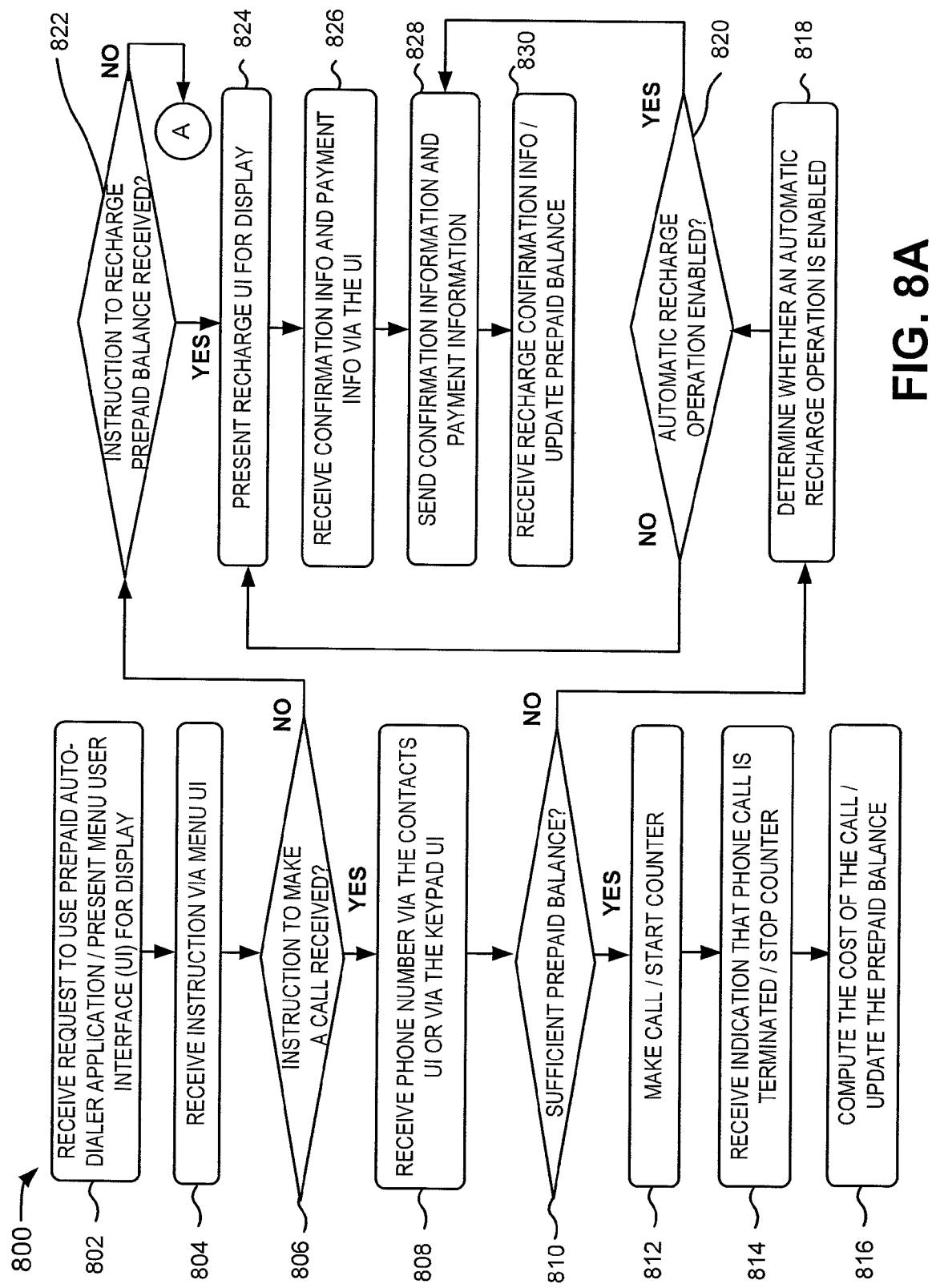
FIGS. 8A-8B are flowcharts of an exemplary process for using a prepaid automatic dialer within the network of FIG. 2.
Figure 8B:
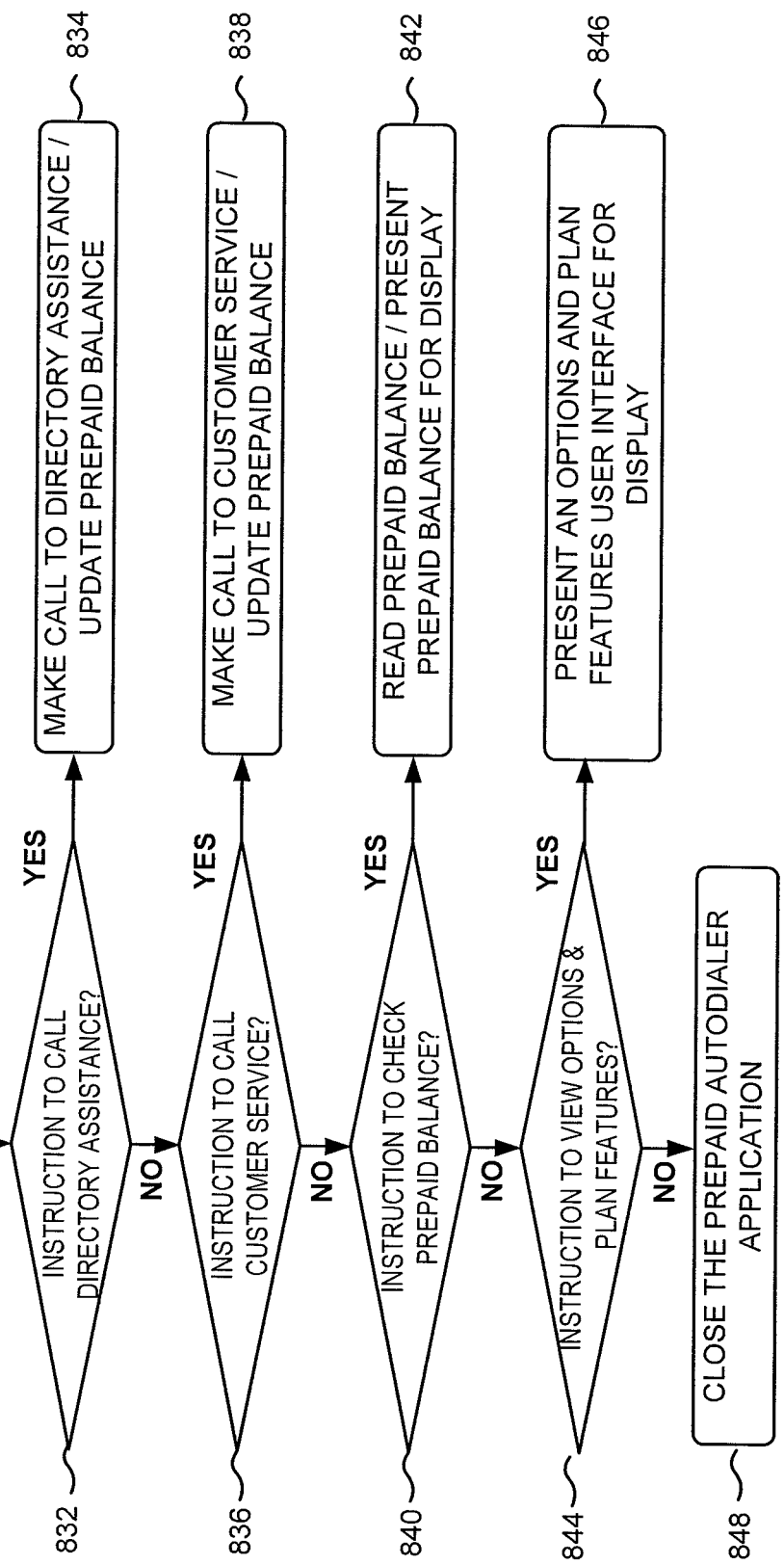

FIGS. 8A and 8B are flowcharts of an exemplary process 800 for using a prepaid automatic dialer within network 200. In one implementation, process 800 may be performed by user device 210 interconnected with application server 220 and/or gateway server 230. In another implementation, some or all of process 800 may be performed by a device or collection of devices separate from, or in combination with, user device 210, application server 220 and/or gateway server 230.

FIGS. 9A-9D are diagrams of exemplary user interfaces 900-940 that are capable of being presented on user device 210. A portion of process 800, of FIGS. 8A and 8B, will be described below with corresponding references to user interfaces 900-940, as shown in FIGS. 9A-9D, respectively.

Process 800 may include receiving a request to use a prepaid autodialer application and a menu user interface may be presented for display (block 802). Assume that a prepaid autodialer application has been downloaded to user device 210 from a particular server (e.g., application server 220), such as a third party vendor website in a manner similar to that described above (with respect to blocks 605-610 of FIG. 6). Assume further that the user selected a particular prepaid calling plan, set up a prepaid calling plan account, and/or received confirmation information (e.g., access number, PIN, etc.) associated with the particular prepaid calling plan in a manner similar to that described above (with respect to blocks 615-630 of FIG. 6). Assume still further that the user specified settings information, associated with the particular prepaid calling plan, in a manner similar to that described above (with respect to blocks 635-640 of FIG. 6).

For example, a user (e.g., a user of user device 210) may send a request to use the prepaid autodialer application by selecting (e.g., double clicking, etc.) an icon associated with the prepaid autodialer application on a display (not shown) associated with user device 210. The prepaid autodialer application may receive the request and may retrieve, from a memory associated with user device 210, information associated with a menu user interface (e.g., menu user interface 900 of FIG. 9A) and may present the information associated with the menu user interface to a display (e.g., display 420 of FIG. 4). For example, menu user interface 900 may include call from contacts button 902, call new number button 904, customer service button 906, options and plan features button 908, recharge button 910, directory assistance button 912, check prepaid balance button 914, and/or end button 916.

Figures 9A, 9B:
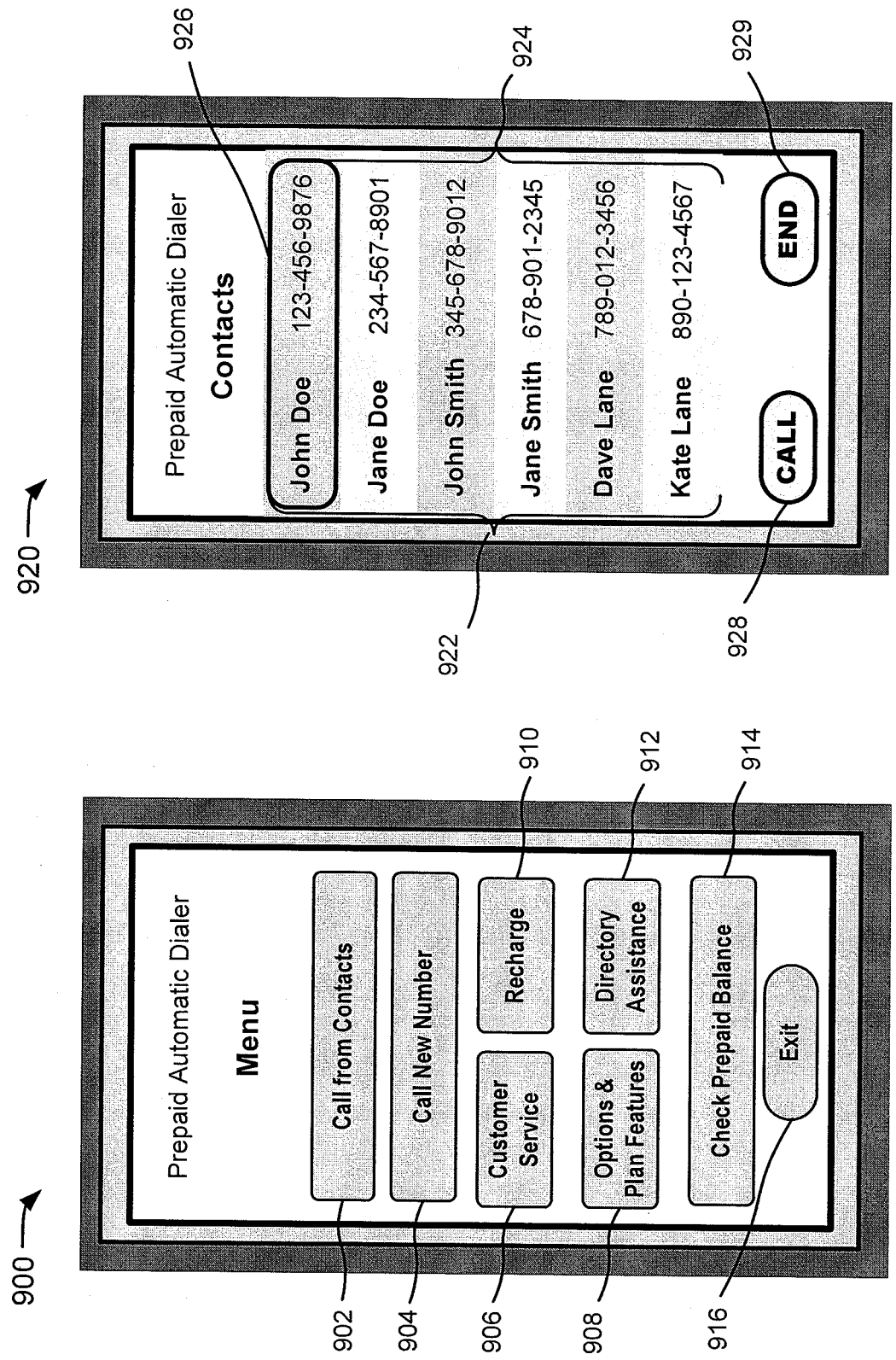
FIG. 9A is a diagram of an exemplary menu user interface that is capable of being presented on the user device of FIG. 2.
FIG. 9B is a diagram of an exemplary contacts user interface that is capable of being presented on the user device of FIG. 2.

While FIG. 9A illustrates menu user interface 900 that includes buttons 902-916, in another implementation, menu user interface 900 may include fewer buttons, additional buttons, different buttons, or differently arranged buttons than are described with respect to FIG. 9A.

An instruction may be received via the menu user interface (block 804). For example, the user, of user device 210, may select call from contacts button 902 to make a call from the contacts list (e.g., if contacts were imported, from user device 210, when the user specified settings associated with the prepaid autodialer application). Alternatively, the user may select call new number button 904 to make a call using a keypad associated with the prepaid dialer application. In another example, the user may select customer service button 906 to speak with a customer service agent associated with the prepaid calling plan. Additionally, or alternatively, the user may select directory assistance button 912 to receive directory assistance, such as to obtain a telephone number and/or address information associated with a destination user device (e.g., user device 210-N). In yet another example, the user may select recharge button 910 to trigger a recharge operation to replenish the prepaid balance of the prepaid account.

In still another example, the user may select the options and plan features button which may cause another menu user interface to be displayed on user device 210. For example, the options and plan features menu user interface (not shown in FIG. 9A) may include an edit settings button that may permit a user to change settings that were specified during the prepaid calling plan set up operation; a vendor information button that may permit the user to review information associated with the vendor from which the prepaid calling plan was purchased (e.g., promotional materials, products and services, etc.); a link to a website associated with the vendor from which the prepaid calling plan was purchased; and/or an advanced features button that may permit the user to review and/or download additional features associated with the prepaid calling plan, prepaid autodialer application, etc. In yet another example, the user may select prepaid balance button 914 (FIG. 9A) that may permit the user to review account information (e.g., prepaid balances, amount of available minutes, account status, amount of next payment, etc.). The user may select exit button 916 to exit the prepaid autodialer application.

If an instruction to make a call is received (block 806—YES), then a telephone number may be received via the contacts user interface or via the keypad user interface (block 808). The prepaid autodialer application may receive an instruction, via the menu user interface, to make a call to destination user device 210 (e.g., user device 210-N).

In one example, the prepaid autodialer application may determine that the instruction is an instruction to place a call from user contacts (e.g., when the user selected the call from contacts button 902 of FIG. 9A). Based on the determination, the prepaid autodialer application may retrieve, from a memory associated with user device 210, information associated with a contacts user interface and contacts information. The prepaid autodialer application may present the information associated with the contacts user interface and contacts information to user device 210 for display (e.g., contacts user interface 920 of FIG. 9B). For example, contacts user interface 920 may include data items, such as a list of contact names 922, a list of telephone numbers 924 corresponding to the list of names 922, a highlight bar 926, call button 928 and/or end button 929. While FIG. 9B illustrates contacts user interface 920 that includes data items 922-929, in another implementation, contacts user interface 920 may include fewer data items, additional data items, different data items, or differently arranged data items than are described with respect to FIG. 9B.

The user may select a particular contact and highlight bar 926 may identify the selection. Additionally, or alternatively, the user may cause the highlight bar 926 to scroll up or down through the contact information until the desired contact information is identified. The user may select the particular contact information (e.g., by pressing a particular button on user device 210 when the highlight bar is position over the particular contact information), may place a call to the telephone number identified in the selected contact information (e.g., by selecting call button 928), and/or may end the call (e.g., by selecting end button 929).

In another example, the prepaid autodialer application may determine that the instruction is an instruction to place a call from the keypad user interface (e.g., when the user selected the call new number button 904 of FIG. 9A). Based on the determination, the prepaid autodialer application may retrieve, from a memory associated with user device 210, information associated with a keypad user interface. The prepaid autodialer application may present information, associated with the keypad user interface (e.g., keypad user interface 930 of FIG. 9C), to user device 210 for display. For example, information associated with the keypad user interface may include data items, such as a telephone number field 932, a keypad 934, call button 936 and/or end button 938. The user may press a series of numbers on keypad 934 to display the desired telephone number in telephone number field 932. The user may place the call by selecting the call button (e.g., call button 936) and may end the call by pressing the end button (end button 938).

Figures 9C, 9D:
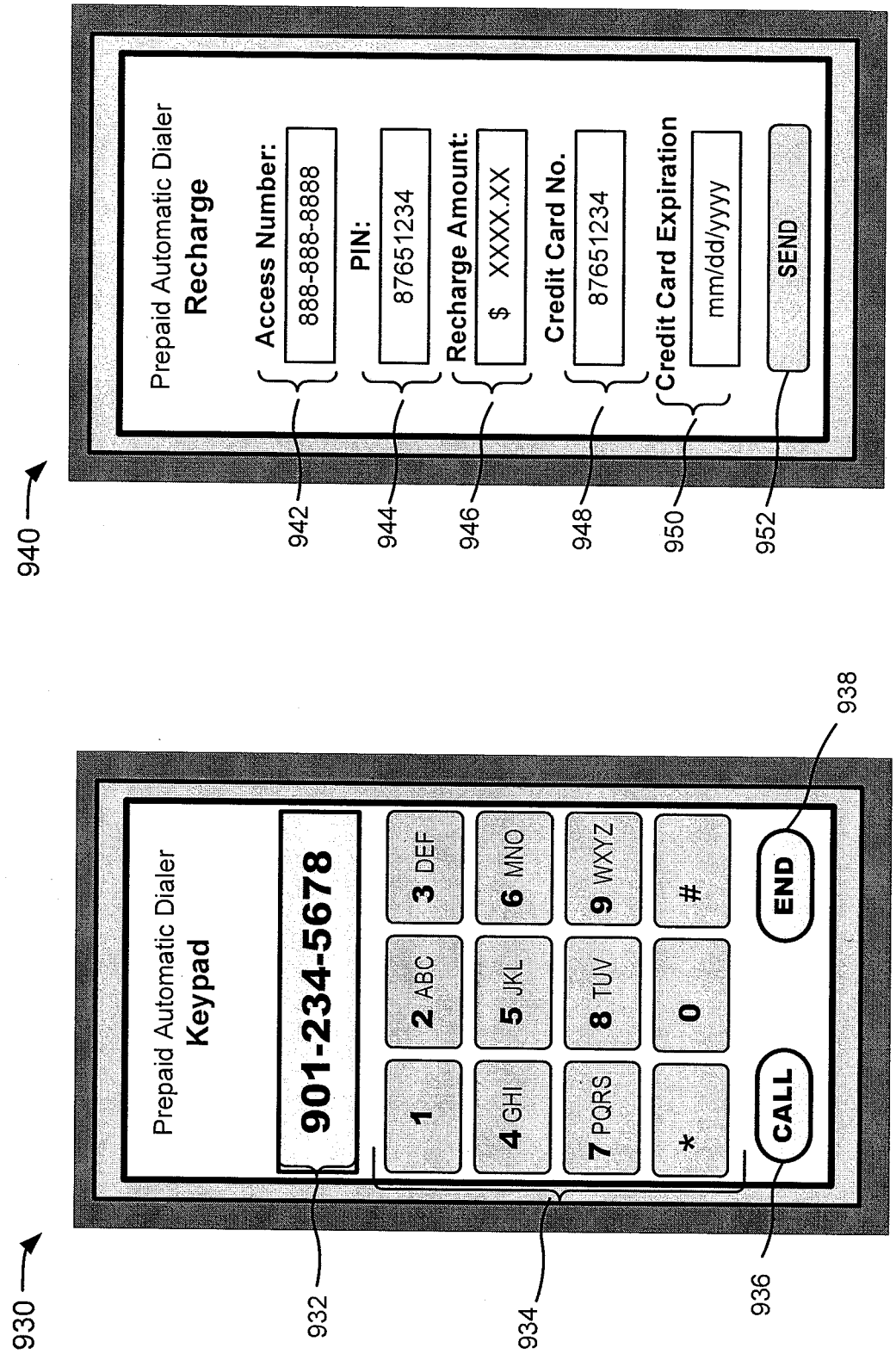
FIG. 9C is a diagram of an exemplary keypad user interface that is capable of being presented on the user device of FIG. 2.
FIG. 9D is a diagram of an exemplary recharge user interface that is capable of being presented on the user device of FIG. 2.

While FIG. 9C illustrates keypad user interface 930 that includes data items 932-938, in another implementation, keypad user interface 930 may include fewer data items, additional data items, different data items, or differently arranged data items than are described with respect to FIG. 9C.

If the prepaid balance is sufficient (block 810—YES), then a call may be placed and a counter may be started (block 812). For example, the prepaid autodialer application may receive the instruction to make a call and may read the prepaid balance information from memory to determine whether the prepaid balance is greater than zero and/or is greater than a particular threshold that may be set by the prepaid calling plan or by the user of user device 210. The prepaid autodialer may compare the prepaid balance read from memory with the particular threshold or a value of zero and based on the determination that the prepaid balance is greater than zero and/or is greater than the particular threshold, the prepaid autodialer application may instruct user device 210 to make the call. The prepaid autodialer may make the call using the telephone number, associated with a destination user device (e.g., user device 210-N), received from the contact information (e.g., via contacts user interface 920 of FIG. 9B, via keypad user interface 930 of FIG. 9C, or from the user device keypad 440 of FIG. 4) and the confirmation information received during the set up operation (e.g., access number, PIN, confirmation number, etc.).

In this example, user device 210 may call gateway server 230, using the access number to make the call. Gateway server 230 may receive the call and user device 210 may send other confirmation information to gateway server 230 (e.g., the PIN, confirmation number, password, and/or other information associated with the user) and/or a telephone number associated with a destination user device (e.g., user device 210-N). Gateway server 230 may receive the PIN number, confirmation number, password, and/or other information associated with the user and may authenticate user device 210 if the PIN number, confirmation number, password and/or other information associated with the user matches a PIN number, a confirmation number, a password, and/or other information associated with the user and retrieved from memory (e.g., a memory associated with gateway server 220). If gateway server 230 authenticates user device 210, then gateway server 230 may establish a connection with the destination user device, via network 250 and using the telephone number, associated with the destination user device, received from the user. The prepaid autodialer application may start a counter and/or begin monitoring the duration of the call (e.g., when ring tones are detected or based on some other indicator).

In another implementation, the user, of user device 210, may use confirmation information, associated with the prepaid calling plan, to make a call from a user device other than user device 210. For example, the user may use another user device (e.g., a landline telephone, a public telephone, a personal computer, etc.) to make a call. In this example, the user may call a destination user device (e.g., user device 210-N), from the other user device, by communicating with gateway server 230. More particularly, the user may communicate with gateway server 230 by dialing the access number, received via the confirmation user interface during the prepaid calling plan set up operation. Gateway server 230 may receive the call and may authenticate the user by requesting that the user enter the PIN number, confirmation number, password and/or other information associated with the user. Gateway server 230 may authenticate the user in a manner similar to that described above and may instruct the user to enter a telephone number associated with the destination user device (e.g., user device 210-N). Gateway server 230 may establish a connection with the destination user device, using the telephone number associated with the destination user device that was received from the user, via network 250.

An indication that the call is terminated may be received and the counter may be stopped (block 814). For example, the prepaid autodialer application may receive an indication that the call is terminated when the user of user device 210 presses a particular button on the user device (e.g., an end button, power off button, etc.); when the user selects the end button on a user interface (e.g., end button 938 on keypad user interface 930 (FIG. 9C) or end button 929 on contacts user interface 920 (FIG. 9B)); and/or when the prepaid autodialer detects a signal that the call is terminated (e.g., a dial tone or some other indicator that the call has been terminated). The prepaid autodialer application may stop the counter and/or end monitoring of the duration of the call based on the determination that the call is terminated.

The cost of the call may be computed and the prepaid balance may be updated (block 816). For example, the prepaid autodialer application may determine the duration of the call from the time that the counter was started to the time that the counter was stopped. The prepaid autodialer application may compute the cost of the call based on the duration of the call, terms and conditions associated with the prepaid calling plan, the rates established for the call (e.g., cost per unit time, such as hours, minutes, seconds, etc.), and/or other fees associated with the call, such as connection fees, surcharges, etc.

The prepaid autodialer application may update the prepaid balance. For example, the prepaid autodialer may update the prepaid balance by subtracting the cost of the call from the prepaid balance before the call was made by user device 210. The prepaid autodialer application may store the updated prepaid balance in the memory and/or may send information associated with the updated prepaid balance to application server 220.

If the prepaid balance is not sufficient (block 810—NO) then it may be determined whether an automatic recharge operation is enabled (block 818). For example, the prepaid autodialer application may read the prepaid balance information from memory to determine whether the prepaid balance is greater than zero and/or is greater than a particular threshold that may be set by the prepaid calling plan or the user of user device 210. Based on the determination that the prepaid balance is not greater than zero and/or is not greater than the particular threshold, the prepaid autodialer application may retrieve, from the memory, the settings information to determine whether an automatic recharge operation has been enabled by the user.

If an automatic recharge operation is not enabled (block 820—NO), then a recharge user interface may be presented for display (block 824). For example, the prepaid autodialer application may determine, from the settings information, that the automatic recharge operation was not enabled by the user and may retrieve information associated with a recharge user interface from a memory associated with user device 210. The prepaid autodialer application may present the information, associated with the recharge user interface (e.g., recharge user interface 940 of FIG. 9D), to user device 210 for display (e.g., on display 420 of FIG. 4). For example, the information associated with recharge user interface 940 may include data fields, such as access number 942, PIN 944, recharge amount 946, credit card number 948, credit card expiration 950, and/or send button 952.

While FIG. 9D illustrates recharge user interface 940 that includes data fields 942-952, in another implementation, recharge user interface 940 may include fewer data fields, additional data fields, different data fields, or differently arranged data fields than are described with respect to FIG. 9D.

If an instruction to make a call is not received (block 806—NO) and an instruction to recharge to prepaid balance is received (block 822—YES), then a recharge user interface may be presented for display (block 824). For example, the prepaid autodialer application may receive an instruction, via the menu user interface (e.g., menu user interface 900 of FIG. 9A), and may determine that the instruction is not an instruction to make a call (e.g., the user did not select call from contacts button 902 or call new number button 904 on menu user interface 900). Furthermore, the prepaid autodialer application may further determine that the instruction was a recharge instruction (e.g., when the user selected recharge button 910 on user interface 900). Based on the determination that an instruction to make a call was not received and that the instruction was a recharge instruction, the prepaid autodialer application may present the information, associated with the recharge user interface (e.g., recharge user interface 940 of FIG. 9D), to user device 210 for display (e.g., on display 420 of FIG. 4) in a manner similar to that described above.

Confirmation information and payment information may be received via the recharge user interface (block 826). For example, the user may enter confirmation information (e.g., an access number, a PIN, confirmation number, etc. received, via the confirmation user interface, during the set up operation), into the access number data field (e.g., access number 942) and PIN data field (e.g., PIN 944), respectively. Additionally or alternatively, the user may enter payment information (e.g., an amount to be recharged to the prepaid calling plan, credit/debit card information) into recharge amount data field (e.g., recharge amount 946), credit card data field (e.g., credit card number 948), and/or card expiration data field (e.g., expiration date 950), respectively.

Confirmation information and payment information may be sent (block 828). For example, when the user has completed entering the confirmation information and/or the payment information into the recharge user interface, the user may select send button 952. The prepaid autodialer application may receive the confirmation information and payment information via the recharge user interface (e.g., recharge user interface 940 of FIG. 9D) and may store the confirmation information and/or payment information in a memory associated with user device 210. The prepaid autodialer application may cause user device 210 to send the confirmation information and/or the payment information to application server 220. Application server 220 may receive the confirmation information and/or payment information and may generate recharge confirmation information. The recharge confirmation information may include an updated access number (or a reactivation of the access number received during the set up operation) and/or an updated PIN (or a reactivation of the PIN received during the set up operation). Application server 220 may update the prepaid balance to the recharged prepaid balance (e.g., by adding the recharge amount to the prepaid balance) and may send recharge confirmation information to user device 210. The recharge confirmation information may include the updated access number, the updated PIN, the recharge prepaid balance, and/or other confirmation information (e.g., reference number, confirmation number, etc.)

In another implementation, user device 210 may not send confirmation information to application server 220. For example, user device 210 may send payment information to application server 220 and the prepaid autodialer application may generate confirmation information (e.g., updated access number, updated PIN, recharged prepaid balance, etc.) in a manner similar to that described above.

Recharge confirmation information may be received and the prepaid balance may be updated (block 830). For example, user device 210 may receive recharge confirmation information from application server 220, may update the prepaid balance (e.g., the sum of the prepaid balance and the recharge amount received from application server 220), and/or may store the updated prepaid balance and confirmation information in memory. If an instruction to make a call was received, then the call may be placed in a manner similar to that described above (with respect to block 812); otherwise, process 800 may end.

In another implementation, user device 210 may not receive confirmation information from application server 220. For example, as described above, the prepaid autodialer application may generate confirmation information, may update the prepaid balance (e.g., by adding the recharge amount), and/or may store the updated prepaid balance and the confirmation information in memory.

If the automatic recharge operation is enabled (block 820—YES), then confirmation information and payment information may be sent (block 828). For example, the prepaid autodialer application may determine, from the settings information, that the automatic recharge operation was enabled by the user. The prepaid autodialer application may further determine, from the settings information, obtained via the settings user interface (e.g., settings user interface 770 of FIG. 7E), that the user authorized a particular recharge amount and/or that payment information, provided during the set up operation, may be used to pay for the automatic recharge operation.

The prepaid autodialer application may, in a manner similar to that described above, send confirmation information and payment information to application server 220, may receive recharge confirmation information from application server 220 and/or may store recharge confirmation information and/or updated prepaid balance information in memory.

In another implementation and in a manner similar to that described above, user device 210 may send payment information to application server 220. For example, the prepaid autodialer application may generate recharge confirmation information and may update the prepaid balance (e.g., by adding to the recharge amount to the prepaid balance).

If an instruction to recharge the prepaid balance is not received (block 822—NO) and if an instruction to call directory assistance is received (block 832—YES), then a call to directory assistance may be made and the prepaid balance may be updated (block 834). For example, the prepaid autodialer application may determine that the instruction received, via the menu user interface, was not a recharge instruction (e.g., the user did not select call from contacts button 902 or call new number button 904 on menu user interface 900 of FIG. 9A). Additionally, the prepaid autodialer application may further determine that an instruction to call directory assistance was received via the menu user interface (e.g., when the user selected directory assistance button 912 on menu user interface 900). The prepaid autodialer application may, based on the determination, communicate with application server 220 to establish a connection with directory assistance associated with application server 220 and/or the prepaid calling plan. The prepaid calling plan may determine the cost of the call, to directory assistance, by determining the duration of the call (e.g., using a counter in a manner similar to that described above (with respect to blocks 812-814)) and/or from other rates as described in the terms and conditions associated with the prepaid calling plan. The prepaid autodialer application may update the prepaid balance by subtracting the cost associated with the call, to directory assistance, from the prepaid balance and may store the updated prepaid balance in memory.

If an instruction to call directory assistance is not received (block 832—NO) and if an instruction to call customer service is received (block 836—YES), then a call to customer service may be made and the prepaid balance may be updated (block 838). For example, the prepaid autodialer application may determine that the instruction received, via the menu user interface, is not an instruction to call directory assistance (e.g., the user did not select directory assistance button 912 on menu user interface 900 of FIG. 9A). Additionally, the prepaid autodialer application may further determine that an instruction to call customer service was received via the menu user interface (e.g., when the user selected customer service button 906 on menu user interface 900). The prepaid autodialer application may, based on the determination, communicate with application server 220 to establish a connection with customer service associated with application server 220 and/or the prepaid calling plan. The prepaid calling plan may determine the cost of the call to customer service by determining the duration of the call (e.g., using a counter in a manner similar to that described above (with respect to blocks 812-814)) and/or from other rates as described in the terms and conditions associated with the prepaid calling plan. The prepaid autodialer application may update the prepaid balance by subtracting the cost associated with the call, to customer service, from the prepaid balance and may store the updated prepaid balance in memory.

If an instruction to call customer service is not received (block 836—NO) and if an instruction to check the prepaid balance is received (block 840—YES), then the prepaid balance may be read and the prepaid balance may be presented for display (block 842). For example, the prepaid autodialer application may determine that the instruction received, via the menu user interface, is not an instruction to call customer service (e.g., the user did not select customer service button 906 on menu user interface 900 of FIG. 9A). Additionally, the prepaid autodialer application may further determine that an instruction to check the prepaid balance was received via the menu user interface (e.g., when the user selected check prepaid balance button 914 on menu user interface 900). The prepaid autodialer application may, based on the determination, read the prepaid balance from memory and may present the prepaid balance to user device 210 for display (e.g., on display 420 of FIG. 4).

If an instruction to check the prepaid balance is not received (block 840—NO), and if an instruction to view an options and plan features menu is received (block 844—YES), then an options and plan features user interface may be presented for display (block 846). For example, the prepaid autodialer application may determine that the instruction received, via the menu user interface, is not an instruction to check the prepaid balance (e.g., the user did not select check prepaid balance button 914 on menu user interface 900 of FIG. 9A). Additionally, the prepaid autodialer application may determine that the instruction received, via the menu user interface, is an instruction to view options and plan features. The prepaid autodialer application may, based on the determination, retrieve information associated with an options and plan features user interface and may present the information associated with the options and plan features user interface to user device 210 for display. In this example, the user may, in a manner similar to that described above (with respect FIG. 9A), edit settings information, access a website associated with a vendor from which the prepaid calling plan was purchased (e.g., by communicating with application server 220), view information associated with the vendor, etc. The information associated with the vendor (e.g., promotional materials, offers for goods or services, etc.) may be retrieved from a memory associated with user device 210 and/or downloaded from application server 220.

If an instruction, to view an options and plan features menu, is not received (block 844—NO), then the prepaid autodialer application may be closed and process 800 may end (block 848). For example, the prepaid autodialer application may determine that the instruction received, via the menu user interface, is not an instruction to view options and plan features. The prepaid autodialer application may, based on the determination, continue to present the menu user interface. Alternatively, the prepaid autodialer application may determine that the instruction received, via the menu user interface, is an instruction to end the prepaid autodialer application. The prepaid autodialer application may receive the instruction and may end the prepaid autodialer application and/or process 800 may end.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6 and 8A-8B, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting the disclosure of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A "component," as used herein, may include hardware, such as a processor, an ASIC, or a FPGA, or a combination of hardware and software (e.g., a processor executing software).

It should be emphasized that the terms "comprises"/"comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a user device, the method comprising:
    downloading, by the user device, autodialer application from an application server, the autodialer application including summaries of plan features and respective terms and conditions associated with a plurality of prepaid calling plans corresponding to at least two different service providers and permitting a user, of the user device, to purchase a prepaid calling plan and make telephone calls using the prepaid calling plan;
    importing, into the autodialer application, one or more contacts from the user device responsive to a user selection, to form a contacts list including associated telephone numbers corresponding to destination user devices;

concurrently presenting, via a user interface generated by the autodialer application, different ones of the plan summaries associated with different ones of the plurality of prepaid calling plans;

receiving, responsive to the presenting, selection of one of the different ones of the plurality of prepaid calling plans;

receiving, by the user device and via the autodialer application, an instruction to purchase the selected prepaid calling plan;

receiving, by the user device and from the user, payment information to establish a prepaid balance associated with the selected prepaid calling plan;

presenting, on a display associated with the user device, confirmation information when the payment information is received, the confirmation information including the prepaid balance and access information;

receiving, by the user device, a request to make a call using the purchased prepaid calling plan, and retrieving, responsive to the request, the contacts list for use in generating a contacts user interface including a telephone number corresponding to a destination user device;

calling, by the user device, the destination user device using the telephone number corresponding to the destination user device and the access information;

determining, by the user device, a duration of the call to the destination user device;

computing, by the user device and under the purchased prepaid calling plan, a cost of the call based on the duration of the call; and updating, by the user device, the prepaid balance based on the computed cost of the call.

2. The method of claim 1, wherein downloading the autodialer application from an application server includes:
storing the autodialer application and information associated with a plurality of prepaid calling plans in a memory of the user device.

3. The method of claim 1, further comprising:
receiving, prior to receiving the selection, a request to review the respective terms and conditions associated with the selected prepaid calling plan; and
presenting, on the display responsive to receiving the request, a terms and conditions user interface comprising:
the respective terms and conditions associated with the prepaid calling plan,
a button corresponding to the instruction to purchase the selected prepaid calling plan, and
a button to return to the generated user interface.

4. The method of claim 1, further comprising:
presenting, on the display associated with the user device, the contacts user interface;
receiving a selection of a contact in the contacts user interface; and
placing the call to the telephone number associated with the selected contact.

5. The method of claim 1, further comprising:
receiving user settings associated with the purchased prepaid calling plan, wherein the user settings include payment information, the payment information including a recharge amount and account information from which the recharge amount can be debited;

determining, responsive to receiving the request to make the call, that the prepaid balance does not exceed a threshold;

determining whether the user settings permit the account information to be used to perform an automatic recharge operation when the prepaid balance does not exceed the threshold;

sending payment information, to the application server, when the user settings indicate that the account information is to be used to perform the automatic recharge operation;

updating the prepaid balance as a sum of the prepaid balance and the recharge amount; and storing the updated prepaid balance in the memory.

6. The method of claim 1, further comprising:
receiving user settings associated with the purchased prepaid calling plan, wherein the user settings include payment information, the payment information including a recharge amount and account information from which the recharge amount can be debited;

determining whether the user settings permit payment information to be used to perform an automatic recharge operation;

presenting, on the display associated with the user device, a recharge user interface when the user settings indicate that the payment information is not to be used to perform the automatic recharge operation;

receiving, via the recharge user interface, other payment information, the other payment information including another recharge amount and other account information from which the other recharge amount is to be debited;

sending the other payment information to the application server;

updating the prepaid balance as a sum of the prepaid balance and the other recharge amount; and storing the updated prepaid balance in the memory.

7. A user device comprising:
a memory; and
a processor to:
receive an autodialer application from an application server, the autodialer application including summaries of plan features and respective terms and conditions associated with a plurality of prepaid calling plans corresponding to at least two different service providers and permitting a user, of the user device, to purchase a prepaid calling plan and make telephone calls using the prepaid calling plan, store the autodialer application in the memory, import, into the autodialer application, one or more contacts from the user device responsive to a user instruction, to form a contacts list including associated telephone numbers corresponding to destination user devices, receive, from the user, an instruction to execute the autodialer application stored in the memory, to concurrently present, via a prepaid calling plans user interface of the autodialer application, different ones of the plan summaries associated with different ones of the plurality of prepaid calling plans, receive, via the autodialer application, an instruction to purchase a particular one of the presented prepaid calling plans, receive, from the user, payment information to establish a prepaid balance associated with the particular prepaid calling plan, present, on a display associated with the user device, confirmation information when the payment information is received, the confirmation information including the prepaid balance and access information, receive another instruction to specify user settings, associated with the particular prepaid calling plan, the user settings including an indication of whether local calls, long distance calls, or international calls are enabled, receive a request to make a long distance call using the particular prepaid, calling plan, and retrieve, responsive to the request, the contacts list for use in generating a contacts user interface including a telephone number corresponding to a destination user device, and place the long distance call to the destination user device, using the telephone number corresponding to the destination user device and the access information, when the user settings indicate that long distance calls are enabled.

8. The user device of claim 7, where the user settings include an indication of whether an automatic recharge operation is permitted and a recharge amount; and the processor is further to:

determine whether the automatic recharge operation is permitted based on the user settings, determine whether the user settings permit payment information to be used to perform the automatic recharge operation when the user settings permit the automatic recharge operation, compute an updated prepaid balance, from a sum of the prepaid balance and the recharge amount, when the user settings indicate that payment information is to be used to perform the automatic recharge operation, and store the updated prepaid balance in the memory.

9. The user device of claim 7, where the processor is further to:

receive a particular request to perform a manual recharge operation, present, on the display associated with the user device, a recharge user interface in response to the particular request, receive, via the recharge user interface, a recharge amount and other payment information from which the recharge amount is to be debited, compute an updated prepaid balance from a sum of the prepaid balance and the recharge amount, and store the updated prepaid balance in the memory.

10. The user device of claim 7, where the processor is further to:

determine a duration of the long distance call to the destination user device, compute a cost of the long distance call based on the duration of the long distance call, and update the prepaid balance based on the cost of the long distance call.

11. The user device of claim 7, where the processor is further to:

present, on the display associated with the user device, an offer to receive advertising in exchange for a particular amount to be applied to the prepaid balance, receive acceptance of the offer, present the advertising on the display associated with the user device in response to the acceptance of the offer, and update the prepaid balance based on the particular amount when the advertising is presented to the user.

12. A non-transitory computer-readable medium that contains instructions, which when executed by a processor of a user device, cause the user device to perform a method comprising:

communicating, with an application server, to retrieve an autodialer application, the autodialer application including summaries of plan features and respective terms and conditions associated with a plurality of prepaid calling plans corresponding to at least two different service providers and enabling a user, of the user device, to establish a prepaid balance associated with a prepaid calling plan the prepaid calling plan;

importing, into the autodialer application, one or more contacts from the user device responsive to a user instruction, to form a contacts list including associated telephone numbers corresponding to destination user devices;

generating a user interface to concurrently present different ones of the plan summaries associated with different ones of the plurality of prepaid calling plans;

receiving, via the user interface, an instruction to establish a prepaid balance, the instruction including payment information from which the prepaid balance is to be established;

presenting, on a display associated with the user device, confirmation information when the payment information is received, the confirmation information including the prepaid balance and access information;

receiving, via the autodialer application, a particular instruction to specify user settings, associated with the prepaid calling plan, the user settings including an indication of whether local calls, long distance calls, or international calls are enabled, receiving, via the autodialer application, a request to make an international call using the prepaid calling plan, and retrieving, responsive to the request, the contacts list for use in generating a contacts user interface including a telephone number corresponding to a destination user device; and placing, via the autodialer application, the international call to the destination user device, using the telephone number corresponding to the destination user device and the access information, when the user settings indicate that international calls are enabled.

13. The non-transitory computer-readable medium of claim 12, wherein communicating with an application server to retrieve an autodialer application includes:

storing the autodialer application and information associated with a plurality of prepaid calling plans in a memory associated with the user device.

14. The non-transitory computer-readable medium of claim 13, wherein receiving the instruction to establish the prepaid balance includes:

receiving, responsive to the presentation of the different ones of the plan summaries, a request for information regarding the respective terms and conditions associated with the different ones of the plurality of prepaid calling plans, receiving, responsive to the request, selection of the prepaid calling plan from the different ones of the plurality of prepaid calling plans, and presenting, responsive to the selection, another user interface comprising:

the respective terms and conditions associated with the prepaid calling plan, a button corresponding to the instruction to establish a prepaid balance, and a button to return to the generated user interface.

15. The non-transitory computer-readable medium of claim 12, wherein the method further comprises:
    determining a duration of the international call to the destination user device,
    computing a cost of the international call based on the duration of the international call, and
    revising the updated prepaid balance based on the cost of the international call.

16. The non-transitory computer-readable medium of claim 12, wherein the method further comprises:
    presenting, on the display associated with the user device, an offer to view promotional material associated with the prepaid calling plan, in exchange for a particular amount to be applied to the prepaid balance,
    receiving acceptance of the offer from the user of the user device,
    presenting the promotional material on the display associated with the user device in response to the acceptance of the offer, and
    updating the prepaid balance based on the particular amount when the promotional material is presented to the user.

17. The non-transitory computer-readable medium of claim 12, wherein the method further comprises:
    receiving user settings associated with the prepaid calling plan, where the user settings include payment information and a recharge amount,
    determining that the prepaid balance does not exceed a threshold,
    determining whether the user settings permit the payment information to be used to perform an automatic recharge operation when the prepaid balance does not exceed the threshold,
    updating the prepaid balance based on the prepaid balance and the recharge amount when the user settings indicate that the account information is to be used to perform the automatic recharge operation, and
    storing the updated prepaid balance in a memory associated with the user device.

18. The non-transitory computer-readable medium of claim 12, wherein the method further comprises:
    receiving user settings associated with the prepaid calling plan, where the user settings include payment information and a recharge amount,
    determining whether the user settings permit the payment information to be used to perform an automatic recharge operation,
    presenting, on the display associated with the user device, a recharge user interface when the user settings indicate that the payment information is not to be used to perform the automatic recharge operation,
    receiving, via the recharge user interface, other payment information from which the recharge amount is to be debited,
    updating the prepaid balance based on the prepaid balance and the other recharge amount, and
    storing the updated prepaid balance in a memory associated with the user device.

19. The non-transitory computer-readable medium of claim 12, wherein the method further comprises:
    retrieving the prepaid balance from a memory associated with the user device, and
    presenting the prepaid balance on the display associated with the user device.

20. The user device of claim 7, wherein the processor is further configured to:
    receive, via the prepaid calling plans user interface, a selection of a button to review terms and conditions associated with the particular prepaid calling plan, and display, responsive to the selection, a teens and conditions user interface presenting:
        the respective terms and conditions associated with the particular prepaid calling plan,
        a button corresponding to the instruction to purchase the particular prepaid calling plan, and
        a button to return to the prepaid calling plans user interface from the terms and conditions user interface.

* * * * *